US011239674B2

(12) United States Patent
Hamilton, IV et al.

(10) Patent No.: US 11,239,674 B2
(45) Date of Patent: Feb. 1, 2022

(54) POWER PACK VENDING APPARATUS, SYSTEM AND METHOD OF USE FOR CHARGING PACKS WITH BIASED LOCKING ARRANGEMENT

(71) Applicant: NRG ENERGY, INC., Houston, TX (US)

(72) Inventors: Calhoun B. Hamilton, IV, Houston, TX (US); Scott C. Burns, The Woodlands, TX (US); Paul Hatch, Chicago, IL (US); Clifford Krapfl, Chicago, IL (US); Anders Olof Rostlund, Chicago, IL (US); James Dangora, Chicago, IL (US); Ross Brinkman, Chicago, IL (US)

(73) Assignee: NRG Energy, Inc., Houston, TX (US)

( * ) Notice: Subject to any disclaimer, the term of this patent is extended or adjusted under 35 U.S.C. 154(b) by 140 days.

(21) Appl. No.: 16/105,672

(22) Filed: Aug. 20, 2018

(65) Prior Publication Data
US 2019/0006862 A1    Jan. 3, 2019

Related U.S. Application Data

(63) Continuation of application No. 14/635,750, filed on Mar. 2, 2015, now Pat. No. 10,084,329.

(Continued)

(51) Int. Cl.
*H02J 7/00* (2006.01)
*G06Q 20/18* (2012.01)
(Continued)

(52) U.S. Cl.
CPC ............ *H02J 7/0045* (2013.01); *G06Q 20/18* (2013.01); *G07F 7/069* (2013.01); *G07F 15/006* (2013.01);
(Continued)

(58) Field of Classification Search
CPC ...... H02J 7/0045; H02J 7/0021; H02J 7/0047; G07F 15/006; G07F 17/0042; G07F 7/069; G06Q 20/18
(Continued)

(56) References Cited

U.S. PATENT DOCUMENTS

| 3,327,278 A * | 6/1967 | Godel | H01R 29/00 |
|---|---|---|---|
| | | | 439/44 |
| 3,752,360 A * | 8/1973 | Craven | G07F 11/32 |
| | | | 221/125 |

(Continued)

FOREIGN PATENT DOCUMENTS

| DE | 19626164 A1 | 1/1998 |
|---|---|---|
| JP | 2001266954 A | 9/2001 |

(Continued)

*Primary Examiner* — John T Trischler
(74) *Attorney, Agent, or Firm* — Bracewell LLP; Douglas W. Rommelmann

(57) ABSTRACT

A power pack vending system comprises a plurality of kiosks including a magazine having a plurality of slots, and a plurality of rechargeable power packs. Each power pack has a unique identifier and is sized to be received within one slot. Each kiosk includes a computer for receiving and storing the unique identifier of each power pack received within the magazine, the specific slot the power pack is in, and current power pack information. The kiosk computer controls a charging unit for charging the power packs. The system includes a central management operation comprising a central computer and central database. The management operation communicates with each kiosk and the central database includes a database storing power pack information for every power pack and a database storing customer information. The central management operation receives, stores and processes information received from the kiosks and sends information to each of the kiosks.

21 Claims, 12 Drawing Sheets

Related U.S. Application Data

(60) Provisional application No. 61/946,447, filed on Feb. 28, 2014.

(51) Int. Cl.
*G07F 7/06* (2006.01)
*G07F 15/00* (2006.01)
*G07F 17/00* (2006.01)

(52) U.S. Cl.
CPC ........ *G07F 17/0042* (2013.01); *H02J 7/0021* (2013.01); *H02J 7/0047* (2013.01)

(58) Field of Classification Search
USPC ........................................................ 320/114
See application file for complete search history.

(56) References Cited

U.S. PATENT DOCUMENTS

| | | | | |
|---|---|---|---|---|
| 3,870,135 A * | 3/1975 | Allen | ................ | G06Q 20/3433 194/205 |
| 4,121,707 A * | 10/1978 | Jacobs | ................ | G07F 5/18 194/219 |
| 4,196,951 A * | 4/1980 | Lotspeich | ................ | G07F 5/26 221/75 |
| 4,236,649 A * | 12/1980 | Fellner | ................ | G07F 9/105 221/90 |
| 4,324,325 A * | 4/1982 | Dewoolfson | ................ | B30B 9/325 194/209 |
| 4,345,679 A * | 8/1982 | DeWoolfson | ................ | B30B 9/325 100/902 |
| 4,440,284 A * | 4/1984 | DeWoolfson | ................ | G07F 7/0609 194/212 |
| 4,469,212 A * | 9/1984 | DeWoolfson | ................ | G07F 7/0609 194/213 |
| 4,491,240 A * | 1/1985 | Ruskin | ................ | G07F 11/62 221/5 |
| 4,492,295 A * | 1/1985 | DeWoolfson | ................ | G07F 7/0609 100/902 |
| 4,573,641 A * | 3/1986 | DeWoolfson | ................ | B02C 19/0087 194/205 |
| 4,577,144 A | 3/1986 | Hodgman et al. | | |
| 4,611,160 A * | 9/1986 | Camens | ................ | H01M 10/46 320/111 |
| 4,789,054 A * | 12/1988 | Shore | ................ | G07F 7/069 194/212 |
| 4,869,395 A * | 9/1989 | Rubbmark | ................ | G07F 5/18 221/131 |
| 4,893,705 A * | 1/1990 | Brown | ................ | G07F 7/069 194/211 |
| 5,025,950 A * | 6/1991 | Trouteaud | ................ | G07F 9/02 221/129 |
| 5,133,441 A * | 7/1992 | Brown | ................ | G07F 7/069 194/211 |
| 5,364,592 A * | 11/1994 | Lewis | ................ | B01L 9/00 206/216 |
| 5,456,884 A * | 10/1995 | Lewis | ................ | B01L 9/00 220/559 |
| 5,499,707 A * | 3/1996 | Steury | ................ | G07F 7/069 186/36 |
| 5,544,784 A | 8/1996 | Malaspina | | |
| 5,631,536 A * | 5/1997 | Tseng | ................ | B60L 53/305 320/137 |
| 5,651,476 A * | 7/1997 | Percy | ................ | G07F 11/04 221/123 |
| 5,691,618 A * | 11/1997 | Kobayashi | ................ | H02J 7/0042 320/115 |
| 5,694,019 A | 12/1997 | Uchida | | |
| 5,711,648 A * | 1/1998 | Hammerslag | ................ | B60L 53/80 414/800 |
| 5,744,933 A * | 4/1998 | Inoue | ................ | G06Q 20/127 320/110 |
| 5,764,026 A * | 6/1998 | Issa | ................ | H01M 10/46 320/104 |
| 5,812,643 A * | 9/1998 | Schelberg, Jr. | ........ | G07F 15/003 235/381 |
| 5,844,401 A * | 12/1998 | Lee | ................ | H02J 7/0042 320/107 |
| 5,926,627 A * | 7/1999 | Sugimura | ............ | G06F 1/1632 710/303 |
| 6,049,192 A | 4/2000 | Kfoury | | |
| 6,314,169 B1 * | 11/2001 | Schelberg, Jr. | ......... | G07F 17/16 379/93.12 |
| 6,330,958 B1 * | 12/2001 | Ruskin | ................ | G06Q 30/06 221/75 |
| 6,356,053 B1 * | 3/2002 | Sandoz | ................ | H02J 7/0044 320/115 |
| 6,367,653 B1 * | 4/2002 | Ruskin | ................ | G07F 9/026 221/1 |
| 6,466,658 B2 * | 10/2002 | Schelberg, Jr. | ......... | G07F 15/12 379/93.12 |
| 6,478,187 B2 * | 11/2002 | Simson | ................ | G07F 5/18 221/75 |
| 6,516,858 B1 * | 2/2003 | Anderson | ................ | E06B 9/32 160/168.1 P |
| 6,618,644 B2 | 9/2003 | Bean | | |
| 6,644,495 B2 * | 11/2003 | Ruskin | ................ | G07F 9/002 221/1 |
| 6,721,400 B2 * | 4/2004 | Schelberg, Jr. | ......... | G06Q 20/18 379/93.12 |
| 6,786,357 B2 * | 9/2004 | Renard | ................ | G07F 11/10 221/197 |
| 6,822,422 B2 * | 11/2004 | Sagawa | ................ | G06Q 10/06 320/109 |
| 6,940,254 B2 * | 9/2005 | Nagamine | ............ | G06Q 30/06 320/109 |
| D520,013 S * | 5/2006 | Yang | ............ | D14/434 |
| 7,045,989 B2 * | 5/2006 | Sakakibara | ........... | H02J 7/0021 320/106 |
| 7,063,232 B2 * | 6/2006 | Chirnomas | ............ | G07F 11/14 221/92 |
| 7,166,987 B2 * | 1/2007 | Lee | ................ | H01M 2/1022 320/114 |
| 7,334,701 B2 * | 2/2008 | Chirnomas | ........... | B65G 47/912 221/104 |
| 7,367,472 B2 * | 5/2008 | Simson | ................ | G07F 11/16 221/130 |
| D592,132 S * | 5/2009 | Lin | ................ | D13/107 |
| D601,089 S * | 9/2009 | Lin | ................ | D13/108 |
| 7,584,868 B2 * | 9/2009 | Bauch | ................ | B65G 33/04 221/197 |
| 7,619,388 B1 | 11/2009 | Nana | | |
| D607,817 S * | 1/2010 | Tan | ................ | D13/108 |
| 7,723,951 B2 * | 5/2010 | Poisner | ................ | H02J 7/0045 320/112 |
| D618,237 S | 6/2010 | Wang | | |
| D628,153 S | 11/2010 | Fugii | | |
| D628,535 S | 12/2010 | Cheng | | |
| 7,889,494 B2 * | 2/2011 | Stampfli | ................ | A45F 5/00 361/679.42 |
| 7,920,905 B2 * | 4/2011 | Bury | ................ | H04M 1/04 455/575.1 |
| 7,923,964 B2 * | 4/2011 | Lin | ................ | H02J 7/0044 320/115 |
| 7,956,576 B2 | 6/2011 | Neu | | |
| D641,695 S * | 7/2011 | Wegener | ................ | D13/108 |
| 8,013,571 B2 * | 9/2011 | Agassi | ................ | H01M 2/1083 320/109 |
| 8,033,424 B2 * | 10/2011 | Rosenblum | ......... | G06F 19/3462 221/198 |
| D652,379 S | 1/2012 | Vandiver | | |
| 8,098,046 B2 * | 1/2012 | Poisner | ................ | H02J 7/0045 320/112 |
| 8,155,784 B2 | 4/2012 | Lowe | | |
| 8,164,300 B2 * | 4/2012 | Agassi | ................ | B60L 53/11 320/104 |
| 8,165,643 B2 * | 4/2012 | Lin | ................ | H02J 7/0044 455/573 |

(56) References Cited

U.S. PATENT DOCUMENTS

| | | | |
|---|---|---|---|
| D659,094 S | 5/2012 | Brand | |
| D662,050 S | 6/2012 | Tien | |
| 8,195,511 B2* | 6/2012 | Bowles | G07F 7/06 |
| | | | 705/14.37 |
| D666,144 S | 8/2012 | Brand | |
| 8,288,028 B2* | 10/2012 | Batra | H02S 40/38 |
| | | | 429/99 |
| D672,309 S | 12/2012 | Tien | |
| D674,748 S | 1/2013 | Ferber | |
| 8,348,450 B2 | 1/2013 | Hebenstreit | |
| 8,355,965 B2 | 1/2013 | Yamada | |
| D680,063 S | 4/2013 | Sasada | |
| D682,196 S | 5/2013 | Leung | |
| D682,197 S | 5/2013 | Leung | |
| 8,459,496 B2* | 6/2013 | Simson | G07F 11/32 |
| | | | 221/130 |
| D686,153 S | 7/2013 | Qu | |
| D697,867 S | 1/2014 | Weinstein | |
| 8,630,088 B2* | 1/2014 | Collopy | G06F 1/1684 |
| | | | 361/679.55 |
| 8,680,869 B2* | 3/2014 | Jiang | H01R 13/2421 |
| | | | 324/437 |
| D702,632 S | 4/2014 | Salmon | |
| 8,744,619 B2* | 6/2014 | Rosenblum | G16H 20/13 |
| | | | 700/237 |
| 8,781,622 B2* | 7/2014 | Mockus | G06Q 20/3224 |
| | | | 700/237 |
| 8,862,304 B2* | 10/2014 | Chen | B60L 1/003 |
| | | | 701/22 |
| 8,862,388 B2* | 10/2014 | Wu | B60L 3/0046 |
| | | | 701/425 |
| 8,878,487 B2* | 11/2014 | Wu | B60L 53/665 |
| | | | 320/108 |
| 8,912,755 B2 | 12/2014 | Wang | |
| 8,988,040 B2* | 3/2015 | Levy | H02J 7/0042 |
| | | | 320/107 |
| 8,988,872 B2* | 3/2015 | Wong | G06F 1/1632 |
| | | | 361/679.42 |
| 8,996,212 B2* | 3/2015 | Chen | G07C 5/0858 |
| | | | 701/22 |
| 8,996,308 B2* | 3/2015 | Wu | B60L 7/22 |
| | | | 701/454 |
| 9,123,035 B2* | 9/2015 | Penilla | B60L 53/68 |
| 9,129,272 B2* | 9/2015 | Penilla | G06Q 20/18 |
| 9,129,461 B2* | 9/2015 | Luke | G06Q 10/02 |
| 9,176,680 B2* | 11/2015 | Chen | H01M 10/4257 |
| 9,177,305 B2* | 11/2015 | Penilla | G06Q 10/02 |
| 9,177,306 B2* | 11/2015 | Penilla | G06Q 20/18 |
| 9,182,244 B2* | 11/2015 | Luke | H02J 7/0021 |
| 9,193,277 B1* | 11/2015 | Penilla | G06Q 50/06 |
| 9,197,087 B2* | 11/2015 | Lai | H02J 7/0042 |
| 9,203,245 B2* | 12/2015 | Aloe | H02J 7/0045 |
| 9,240,007 B2* | 1/2016 | Barragan Trevino | G07F 9/026 |
| 9,275,505 B2* | 3/2016 | Taylor | B60L 53/65 |
| 9,276,418 B2* | 3/2016 | Kawasaki | H02J 7/0027 |
| 9,335,179 B2* | 5/2016 | Penilla | G01C 21/3407 |
| D758,965 S * | 6/2016 | Jen | D13/108 |
| 9,389,660 B2* | 7/2016 | Jau | H02J 9/00 |
| 9,424,697 B2* | 8/2016 | Wu | B60L 53/68 |
| 9,436,803 B2* | 9/2016 | Rosenblum | G16H 20/13 |
| 9,440,544 B2* | 9/2016 | Lewis | B60L 53/665 |
| 9,472,043 B2* | 10/2016 | Mockus | G06Q 20/18 |
| 9,496,720 B2* | 11/2016 | McShane | H01M 10/486 |
| 9,508,212 B2* | 11/2016 | Peters | G06Q 20/405 |
| 9,552,682 B2* | 1/2017 | Luke | G06F 3/0671 |
| 9,738,168 B2* | 8/2017 | Penilla | H01M 2/1077 |
| 9,779,215 B2* | 10/2017 | Rosenblum | G06Q 10/10 |
| 9,870,670 B2* | 1/2018 | Yau | G07F 15/003 |
| 9,904,911 B2* | 2/2018 | Bowles | G07F 7/06 |
| 9,919,277 B2 | 3/2018 | Griffiths et al. | |
| 10,014,701 B2* | 7/2018 | Toya | H02J 7/0026 |
| 10,040,359 B2* | 8/2018 | Chen | B60L 53/16 |
| 10,076,050 B2* | 9/2018 | Roberts | G06F 1/1632 |
| 10,084,327 B2* | 9/2018 | Roberts | H02J 7/0027 |
| 10,116,151 B2* | 10/2018 | Seng | H02J 7/0042 |
| 10,286,842 B2* | 5/2019 | Penilla | G06Q 10/02 |
| 10,460,547 B2* | 10/2019 | Yau | G06Q 20/3223 |
| 2002/0064258 A1* | 5/2002 | Schelberg, Jr. | G07F 17/16 |
| | | | 379/91.01 |
| 2002/0117510 A1* | 8/2002 | Simson | G07F 5/18 |
| | | | 221/68 |
| 2002/0153382 A1* | 10/2002 | Ruskin | G07F 9/026 |
| | | | 221/1 |
| 2002/0156537 A1* | 10/2002 | Sakakibara | H02J 7/0021 |
| | | | 700/1 |
| 2003/0010827 A1* | 1/2003 | Hilton | G06K 13/10 |
| | | | 235/475 |
| 2003/0069050 A1* | 4/2003 | Lin | H02J 7/0045 |
| | | | 455/572 |
| 2003/0091168 A1* | 5/2003 | Schelberg, Jr. | G07F 9/002 |
| | | | 379/93.12 |
| 2003/0120380 A1* | 6/2003 | Bean | G07F 7/06 |
| | | | 700/231 |
| 2003/0136794 A1* | 7/2003 | Chirnomas | G07F 11/14 |
| | | | 221/123 |
| 2003/0209375 A1* | 11/2003 | Suzuki | H02J 11/00 |
| | | | 180/65.22 |
| 2004/0016620 A1* | 1/2004 | Davis | G07F 7/069 |
| | | | 194/205 |
| 2004/0026441 A1* | 2/2004 | Chirnomas | G07F 11/14 |
| | | | 221/92 |
| 2004/0056041 A1* | 3/2004 | Renard | G07F 11/24 |
| | | | 221/277 |
| 2004/0108329 A1* | 6/2004 | Ruskin | G06Q 30/06 |
| | | | 221/197 |
| 2004/0190694 A1* | 9/2004 | Schelberg, Jr. | G06Q 20/127 |
| | | | 379/93.12 |
| 2005/0001591 A1* | 1/2005 | Nagamine | G06Q 30/06 |
| | | | 320/132 |
| 2005/0007066 A1* | 1/2005 | Long | H02J 7/0044 |
| | | | 320/107 |
| 2005/0211720 A1* | 9/2005 | Chirnomas | G07F 11/14 |
| | | | 221/92 |
| 2005/0211721 A1* | 9/2005 | Chirnomas | B65G 47/912 |
| | | | 221/123 |
| 2005/0247721 A1* | 11/2005 | Simson | G07F 11/38 |
| | | | 221/75 |
| 2005/0280395 A1* | 12/2005 | Kwon | G06F 1/1601 |
| | | | 320/114 |
| 2006/0074524 A1* | 4/2006 | Chirnomas | B65G 57/302 |
| | | | 700/242 |
| 2006/0182240 A1* | 8/2006 | Schelberg, Jr. | G07F 9/002 |
| | | | 379/93.01 |
| 2006/0182241 A1* | 8/2006 | Schelberg, Jr. | G07F 17/0014 |
| | | | 379/93.12 |
| 2006/0226805 A1* | 10/2006 | Yu | H02J 7/342 |
| | | | 320/107 |
| 2007/0050266 A1* | 3/2007 | Barber | G06Q 30/0601 |
| | | | 705/26.1 |
| 2007/0236180 A1 | 10/2007 | Rodgers | |
| 2008/0007211 A1* | 1/2008 | Poisner | H02J 7/0045 |
| | | | 320/107 |
| 2008/0164279 A1* | 7/2008 | Chirnomas | G07F 11/62 |
| | | | 221/123 |
| 2008/0234013 A1* | 9/2008 | Bury | B60R 11/0241 |
| | | | 455/575.1 |
| 2008/0281732 A1* | 11/2008 | Yamada | H01M 10/48 |
| | | | 705/30 |
| 2009/0014460 A1* | 1/2009 | Kobus, II | G06Q 20/127 |
| | | | 221/135 |
| 2009/0033278 A1* | 2/2009 | Ludtke | H02J 7/0045 |
| | | | 320/106 |
| 2009/0051319 A1* | 2/2009 | Fang | H02J 7/0044 |
| | | | 320/115 |
| 2009/0057333 A1* | 3/2009 | Simson | G07F 11/38 |
| | | | 221/278 |
| 2009/0133733 A1* | 5/2009 | Retti | H02S 10/10 |
| | | | 136/206 |
| 2009/0198372 A1* | 8/2009 | Hammerslag | G07F 15/005 |
| | | | 700/226 |

(56) References Cited

U.S. PATENT DOCUMENTS

| | | | | |
|---|---|---|---|---|
| 2009/0263704 A1* | 10/2009 | Batra | H02S 20/30 | 429/61 |
| 2010/0088192 A1* | 4/2010 | Bowles | G06Q 30/0278 | 705/26.1 |
| 2010/0161114 A1* | 6/2010 | Ruskin | G07F 9/026 | 700/241 |
| 2010/0201307 A1* | 8/2010 | Poisner | H02J 7/0045 | 320/106 |
| 2010/0228405 A1* | 9/2010 | Morgal | G07B 15/00 | 701/2 |
| 2010/0312380 A1* | 12/2010 | Lowe | G07F 11/62 | 700/232 |
| 2010/0312938 A1* | 12/2010 | Stampfli | H04B 1/3888 | 710/304 |
| 2011/0074334 A1* | 3/2011 | Wang | H01M 10/465 | 320/101 |
| 2011/0106329 A1* | 5/2011 | Donnelly | B60L 53/64 | 700/291 |
| 2011/0169451 A1* | 7/2011 | Stampfli | H04R 1/1033 | 320/115 |
| 2011/0234160 A1* | 9/2011 | Smith | H02J 7/00043 | 320/110 |
| 2011/0273180 A1* | 11/2011 | Park | G01R 31/371 | 324/427 |
| 2012/0016518 A1* | 1/2012 | Saario | G06Q 20/18 | 700/232 |
| 2012/0029691 A1* | 2/2012 | Mockus | H04W 4/06 | 700/232 |
| 2012/0078413 A1* | 3/2012 | Baker, Jr. | G07F 15/006 | 700/232 |
| 2012/0091961 A1* | 4/2012 | Hani | B60L 53/65 | 320/109 |
| 2012/0169277 A1* | 7/2012 | Chen | H02P 9/04 | 320/108 |
| 2012/0222938 A1* | 9/2012 | Rose, Jr. | G07F 11/58 | 198/572 |
| 2012/0268064 A1 | 10/2012 | Ostrom | | |
| 2012/0271723 A1* | 10/2012 | Penilla | G01C 21/3407 | 705/16 |
| 2012/0306431 A1* | 12/2012 | Li | A45C 11/00 | 320/101 |
| 2013/0002049 A1 | 1/2013 | Stampfli | | |
| 2013/0026971 A1* | 1/2013 | Luke | B60L 3/003 | 320/104 |
| 2013/0030920 A1* | 1/2013 | Wu | G06Q 30/0259 | 705/14.64 |
| 2013/0063073 A1 | 3/2013 | Kawasaki | | |
| 2013/0106352 A1 | 5/2013 | Nagamine | | |
| 2013/0150134 A1* | 6/2013 | Pliner | H02J 7/0044 | 455/573 |
| 2013/0181661 A1* | 7/2013 | Workman | H02J 7/0042 | 320/107 |
| 2013/0187607 A1 | 7/2013 | Wang | | |
| 2013/0193911 A1* | 8/2013 | Miller | H02J 7/0027 | 320/107 |
| 2013/0241470 A1* | 9/2013 | Kim | H02J 7/0044 | 320/107 |
| 2013/0278215 A1* | 10/2013 | Dea | H02J 7/02 | 320/111 |
| 2013/0328526 A1* | 12/2013 | Levy | H01R 31/065 | 320/109 |
| 2013/0335027 A1* | 12/2013 | Xin | G07F 17/20 | 320/114 |
| 2014/0019255 A1* | 1/2014 | Wu | B60L 58/16 | 705/14.64 |
| 2014/0028247 A1 | 1/2014 | Qu | | |
| 2014/0032412 A1* | 1/2014 | Park | G06Q 20/18 | 705/44 |
| 2014/0110206 A1 | 4/2014 | Wang | | |
| 2014/0143074 A1* | 5/2014 | Kolls | G06F 7/08 | 705/16 |
| 2014/0175031 A1* | 6/2014 | Roberts | H02J 7/0027 | 211/26.2 |
| 2014/0176072 A1* | 6/2014 | Lai | G06F 1/1635 | 320/115 |
| 2014/0310165 A1* | 10/2014 | Yau | G07F 7/06 | 705/39 |
| 2014/0312831 A1* | 10/2014 | Lewis | B60L 53/65 | 320/107 |
| 2014/0340021 A1* | 11/2014 | Lai | H02J 7/0063 | 320/103 |
| 2014/0350716 A1* | 11/2014 | Fly | B65G 1/02 | 700/215 |
| 2014/0368156 A1* | 12/2014 | Aloe | G06Q 20/347 | 320/106 |
| 2015/0005933 A1* | 1/2015 | Mockus | G06Q 20/327 | 700/232 |
| 2015/0025923 A1* | 1/2015 | Wu | B60L 53/68 | 705/5 |
| 2015/0032502 A1* | 1/2015 | Green | G06Q 30/0201 | 705/7.29 |
| 2015/0045947 A1* | 2/2015 | Yau | G06Q 20/18 | 700/237 |
| 2015/0077221 A1* | 3/2015 | Peters | G07F 17/00 | 340/5.28 |
| 2015/0127479 A1* | 5/2015 | Penilla | G01C 21/3679 | 705/26.1 |
| 2015/0134467 A1* | 5/2015 | Penilla | G06Q 50/06 | 705/16 |
| 2015/0134546 A1* | 5/2015 | Penilla | G06Q 10/02 | 705/305 |
| 2015/0137759 A1* | 5/2015 | Palmer | H02J 7/0045 | 320/112 |
| 2015/0321571 A1* | 11/2015 | Penilla | B60L 53/305 | 320/104 |
| 2016/0025506 A1* | 1/2016 | Penilla | B60L 53/80 | 701/430 |
| 2016/0068075 A1* | 3/2016 | Chen | H05K 5/0026 | 320/107 |
| 2016/0071079 A1* | 3/2016 | Aloe | H02J 7/00047 | 705/17 |
| 2016/0099590 A1* | 4/2016 | Velderman | H02J 7/0045 | 320/113 |
| 2016/0180632 A1* | 6/2016 | Santana | H02J 7/0027 | 700/238 |
| 2016/0197337 A1* | 7/2016 | Yau | H01M 10/0436 | 429/7 |
| 2016/0205800 A1* | 7/2016 | Roberts | H04B 1/3888 | 361/809 |
| 2016/0214535 A1* | 7/2016 | Penilla | B60L 53/65 | |
| 2016/0236867 A1* | 8/2016 | Brazeau | B65G 1/1378 | |
| 2016/0268822 A1* | 9/2016 | Toya | H02J 7/0013 | |
| 2016/0300409 A1* | 10/2016 | Peters | G07C 9/20 | |
| 2017/0085103 A1* | 3/2017 | Seng | H02J 7/00 | |
| 2017/0190259 A1* | 7/2017 | Penilla | B60L 58/12 | |
| 2017/0322561 A1* | 11/2017 | Stiernagle | B65G 1/04 | |
| 2017/0330158 A1* | 11/2017 | Librizzi | G06Q 20/18 | |
| 2017/0331318 A1* | 11/2017 | Jankins | H02J 50/12 | |
| 2018/0137715 A1* | 5/2018 | Yau | G06Q 20/18 | |
| 2019/0157881 A1* | 5/2019 | Velderman | H02J 2207/40 | |
| 2019/0168876 A1* | 6/2019 | Goodman | B60L 53/10 | |
| 2019/0252894 A1* | 8/2019 | Ruan | H02J 7/0044 | |
| 2020/0044207 A1* | 2/2020 | Murphey | H01R 13/639 | |
| 2020/0066081 A1* | 2/2020 | Yau | G06Q 20/3224 | |
| 2021/0044128 A1* | 2/2021 | Roberts | H02J 7/0013 | |

FOREIGN PATENT DOCUMENTS

| | | |
|---|---|---|
| WO | 9847799 | 10/1998 |
| WO | 2010040116 | 4/2010 |
| WO | 2012119289 | 9/2012 |
| WO | 2013074819 | 5/2013 |
| WO | 2013142154 | 9/2013 |

* cited by examiner

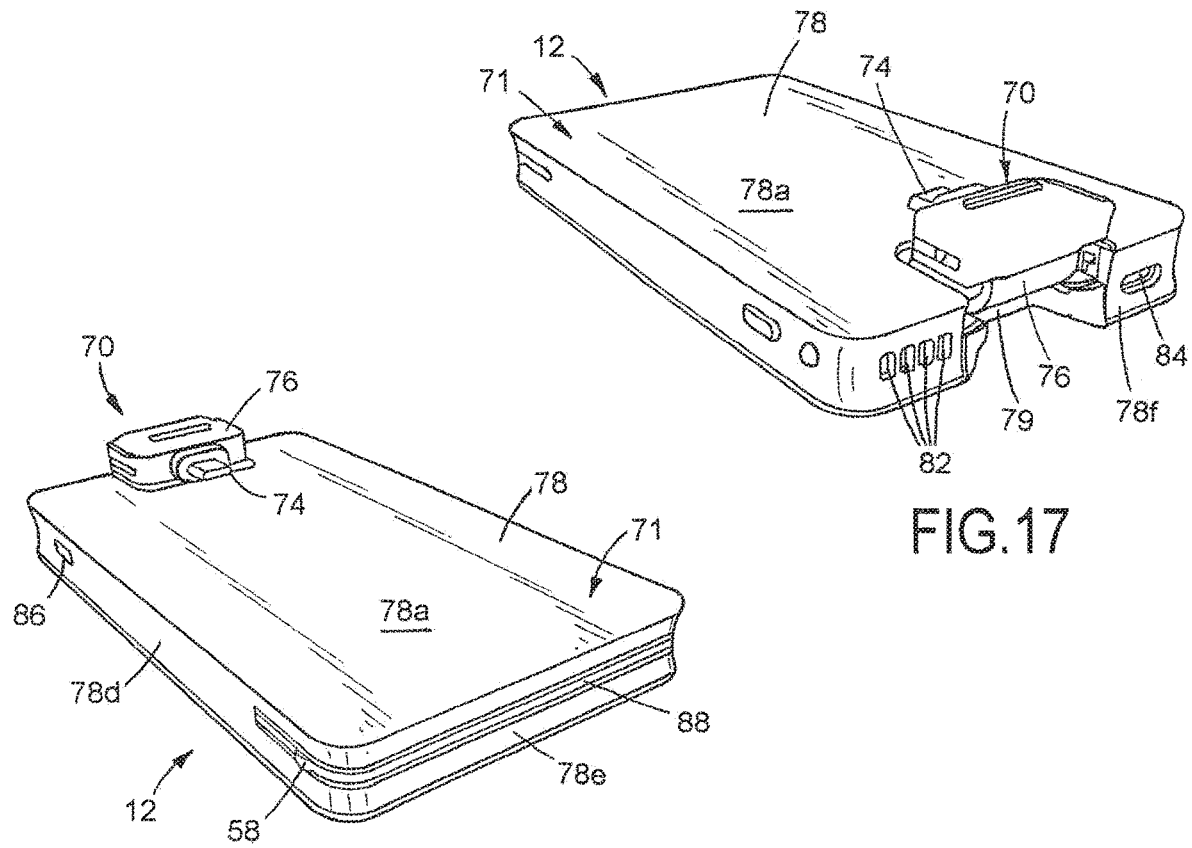
FIG.17
FIG.16
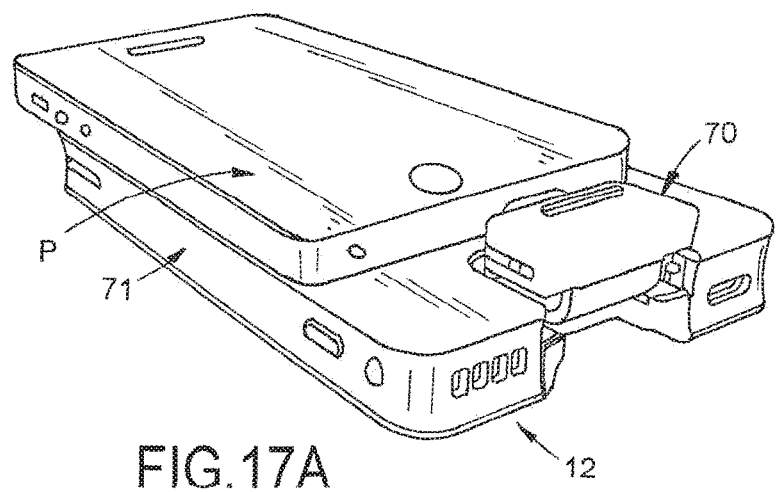
FIG.17A

POWER PACK VENDING APPARATUS, SYSTEM AND METHOD OF USE FOR CHARGING PACKS WITH BIASED LOCKING ARRANGEMENT

CROSS-REFERENCE TO RELATED APPLICATIONS

This application is a continuation of U.S. patent application Ser. No. 14/635,750 filed Mar. 2, 2015, which claims the benefit of U.S. Provisional Application Ser. No. 61/946,447 filed Feb. 28, 2014. Applicant incorporates by reference herein Application Ser. No. 61/946,447 in its entirety.

BACKGROUND OF THE INVENTION

1. Field of the Invention

The present invention relates to a power pack vending apparatus, system and method of using same, and more particularly relates to a plurality of vending apparatus capable of receiving and disbursing power packs, recharging received power packs, and a network system for communicating customer information, inventory and transactional information.

2. Description of Related Art

The widespread use and number of portable electronic devices has significantly increased in recent years and continues to grow. This is especially true with respect to mobile phones as a result of being able to do things other than simply have a telephone conversation with another person. Today's mobile phones send and receive e-mails and text messages, access and display internet content, take pictures and videos, play music, display television broadcasts, manage a user's schedule, execute software games, etc. In addition to mobile phones, there are numerous other portable electronic devices regularly transported and carried about by users on a frequent, if not daily, basis. A few such examples include notebook computers, PDAs, digital cameras, video cameras, and electronic books.

These portable electronic devices are typically powered by a rechargeable power or battery pack. As battery technology has improved, the size and weight of rechargeable battery packs has decreased while the capacity of the battery packs has increased. This improvement has contributed to an increase in the functionality of the portable electronic devices.

However, as portable electronic devices offer increased capabilities and functionality, the use of the portable electronic device significantly increases as well. As a result, the user spends more time on the device on a daily basis and becomes significantly more dependent on the device to function. For some users, not having access 24/7 (24 hours per day, 7 days a week) to their device's capabilities and functionality is a serious issue causing the user emotional distress and frustration. Constant access to the functioning portable electronic device is highly desired, if not necessary, to a large portion of the population.

Unfortunately, battery technology has not kept up with the capacity demands of high usage users of portable electronic devices. As a result, there are many occasions where the user is stranded with a "dead" device (i.e., the device is unusable because the battery back is depleted). Additionally, there are users who fail to recharge their device, or users travelling or in remote locations who fail have their charger with them. There are numerous examples where users may find themselves in a situation where the device is unusable because the battery back is depleted.

To reduce the risk of being stranded with a dead device, some users carry a charger at all times and charge their device in a place where there is a wall outlet. However, it is inconvenient to carry a charger all the time. Additionally, wall outlets are not always available to the user. Even if an outlet is available the device has about a three foot tether to the outlet during the charge time—which may inconvenience the user.

Other options are for the user to purchase and always carry around a spare fully charged battery pack. However, this is inconvenient to carry a spare battery pack all the time. Some places, such as airports, have kiosks where the device can be recharged; however during this time the device is not usable by the user.

It is desirable to have power pack dispensers where customers can acquire charged power packs for powering their portable electronic device. It is desirable that the dispensers be geographically distributed and also allow for the return of the dispensed power pack. It is further desirable that the dispenser be equipped to automatically recharge the returned power packs and prepare them for rental by future customers.

BRIEF SUMMARY OF THE INVENTION

One embodiment of the present invention comprises geographically distributed automated retail kiosks containing power packs for portable electronic devices to create a nationwide mobile charging service network aimed at allowing customers to never be without power for their portable electronic devices while on the go. The automated kiosks dispense fully-charged mobile charging power packs to customers for a rental fee, monthly subscription fee, purchase fee, or coupon code for a free rental. The mobile charging power pack connects to the customer's portable electronic device providing needed power. The power pack may be used to immediately power the portable electronic device and/or recharge the battery of the portable electronic device.

Upon the power pack becoming discharged, the customer returns the power pack to any geographically distributed kiosk or mails it back. The kiosks are equipped to automatically recharge the returned power packs and prepare them for rental by future customers. In one embodiment the recharging of the power packs is proprietary to the vending system so the customer is unable to recharge the power packs on their own.

In a preferred embodiment, the kiosk communicates with the power pack, while in the kiosk, to retrieve power pack data to determine cycle life, battery health, performance, etc. In one embodiment the power pack communicates with the customer's device during use via a power pack app installed on the customer's device to display information related to charge life, time-to-charge, kiosk locations, etc. Preferably, the kiosks are widely distributed, especially in places frequented by large numbers of people on the go. Some examples include airports, convention centers, theme parks, malls, hotels, supermarkets, convenience stores and fueling service stations. In one embodiment, location of the power packs is tracked by the networked system and the system knows when the power pack is returned by the customer.

BRIEF DESCRIPTION OF THE SEVERAL VIEWS OF THE DRAWINGS

So that the manner in which the above recited features and advantages of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention, and are therefore not to be considered limiting of its scope, for the invention may admit to other equally effective embodiments that vary only in detail. In the drawings:

FIG. 4 is a front and side perspective view of another preferred embodiment of vending kiosk according to the present invention;

FIGS. 16 and 17 are perspective views of the power pack of FIG. 12 showing the device connector assembly in a "ready to connect" position;

FIG. 17A is a perspective view of the power pack of FIG. 17 showing the device connector assembly connected to a smartphone;

DESCRIPTION OF THE PREFERRED EMBODIMENTS OF THE INVENTION

Figure 1:
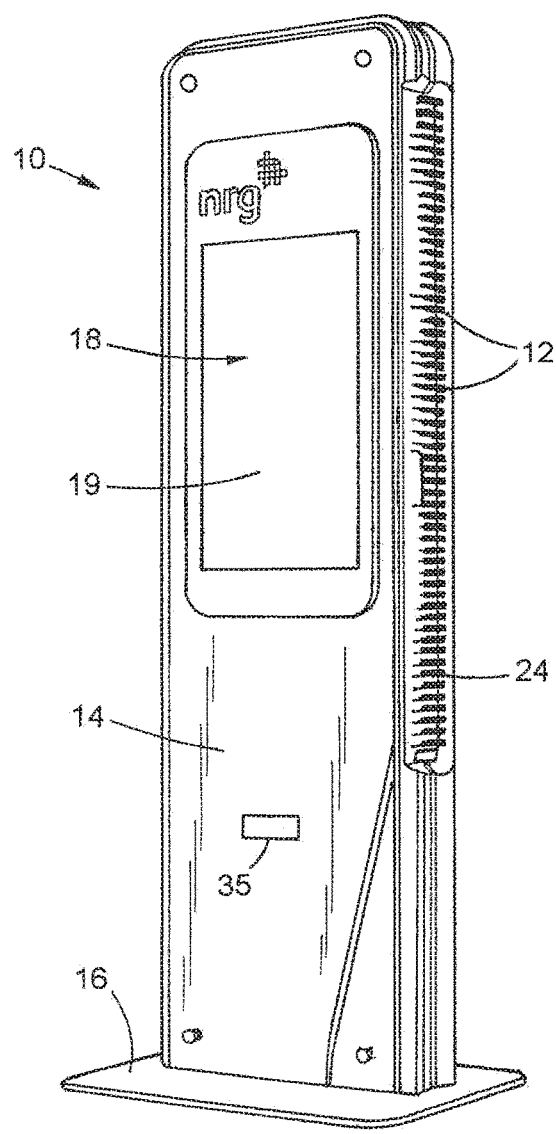
FIG. 1 is a front and side perspective view of a vending kiosk according to a preferred embodiment of the present invention.

While this invention is susceptible of many embodiments, there is shown in the drawings and described herein in detail preferred embodiments of the invention with the understanding that the present disclosure is to be considered as an exemplification of the principles of the invention and is not intended to limit the broad aspect of the invention to the embodiments illustrated.

Figure 2:
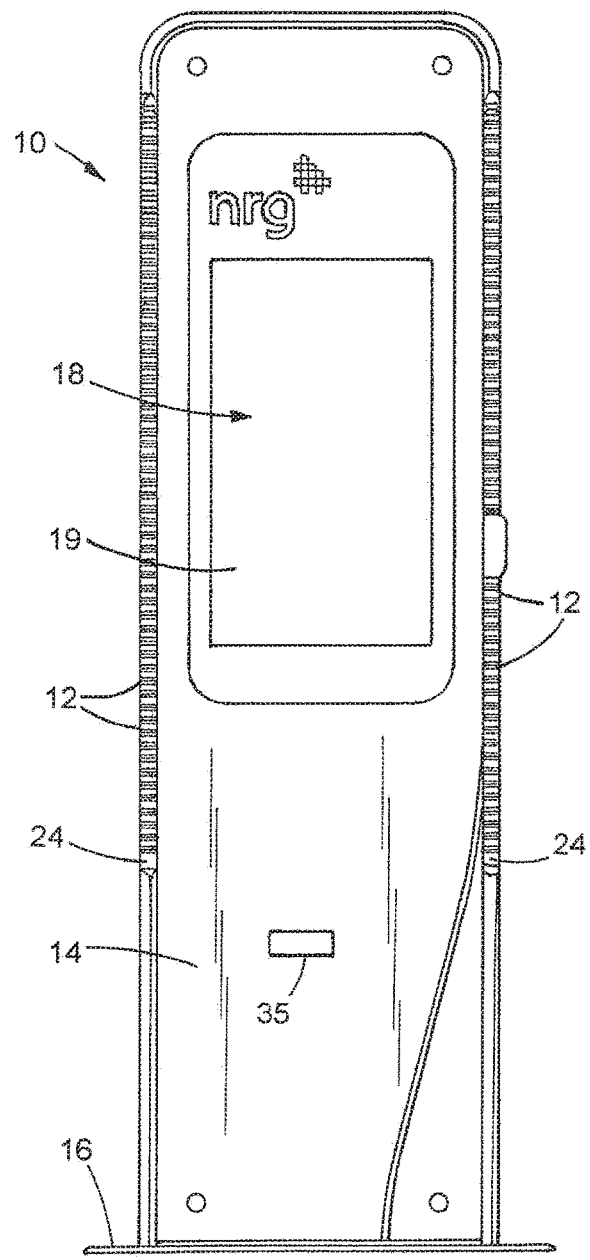
FIG. 2 is a front view of the vending kiosk of FIG. 1.
Figure 18:
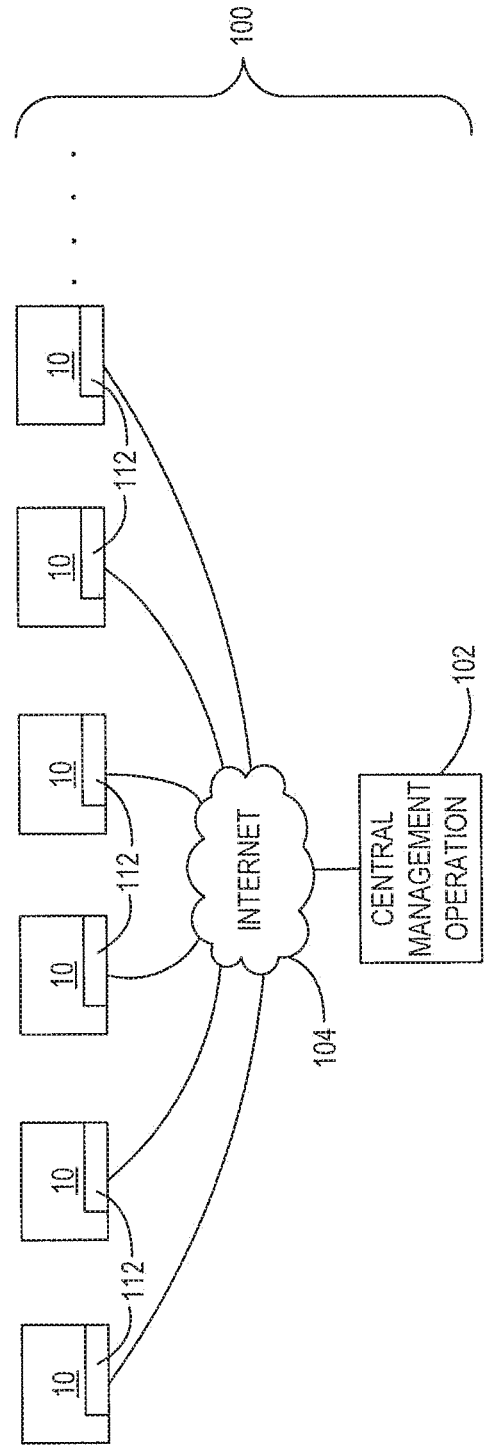
FIG. 18 is an illustration of a system for communicating and processing information in a network of vending kiosks and a central management operation.
Figure 19:
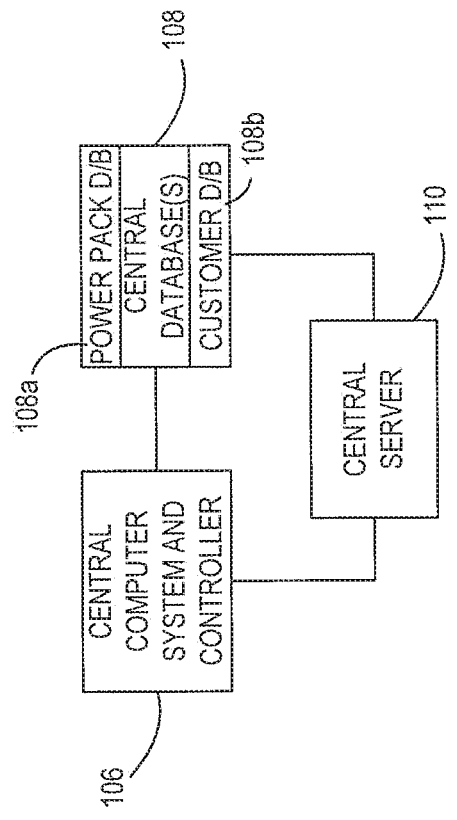
FIG. 19 shows one composition of the central management operation.

FIGS. 1 and 2 illustrate a vending machine or kiosk generally designated 10. The kiosk 10 is one of a plurality of such machines included within a system 100 of kiosks. As shown in FIG. 18, the system 100 has a plurality of the kiosks 10 situated at a plurality of locations and a central management operation 102 in electrical communication with the kiosks 10 to form a network 104. The central management operation 102 may comprise a host computer system and controller 106, a central server 110, one or more central databases 108, etc. as shown in FIG. 19. The central management operation 102 is connected to the kiosks 10 by any means suitable to transmit communications between the central management operation 102 and the kiosks 10. For example, the connection may be hardwired or by a communication network line, for example, a PSTN (Public Switched Telephone Network), an ISDN (Integrated Service Digital Network), a wireless telephone network, etc.

In a preferred embodiment, each vending apparatus or kiosk 10 of the system 100 contains a plurality of portable power packs 12 that are adapted to recharge and/or power a customer's portable device P (FIG. 17A). Portable electronic devices P as used herein includes, but is not limited to, smartphones, tablets, laptops, digital cameras, video cameras, flashlights, personal wearable devices, etc. In one embodiment, the kiosk 10 may vend multiple types of power packs 12 that can be utilized by customers with various types of portable electronic devices. In another embodiment, the kiosk 10 may vend power packs 12 having a power capacity suitable to recharge and/or power portable devices such as cell phones and smartphones, etc. requiring one (1) amp. In another embodiment the kiosk 10 may vend power packs 12 having two (2) amp capacity. In another embodiment the kiosk 10 may be designed to vend a plurality of power packs 12 of various sizes, shapes, and/or capacities. Those skilled in the art will appreciate that the kiosk 10 is not limited to power packs 12 for the aforementioned products, but rather will have applicability for use in the vending of a variety of power packs 12.

The kiosks 10 are preferably located at places frequented by large numbers of people, such as shopping centers and malls, airports, convention centers, public transit stations, colleges and universities, metropolitan areas, stadiums, ball parks, public recreational areas, etc. The kiosks 10 may basically be placed anywhere that experiences a number of people "on the go" or people having limited access to standard electrical outlets that are needed to recharge/power their portable devices. For example, it may be desirable to have a kiosk near a retail establishment, such as Starbucks, where people tend to stay for extended periods of time using their portable devices while enjoying a large latte.

As shown in FIGS. 1 and 2, one embodiment of the kiosk 10 includes an outer housing assembly 14 with front, rear, top and side surfaces. The outer housing assembly 14 may be mounted to a base plate 16 or other support structure.

Figure 3:
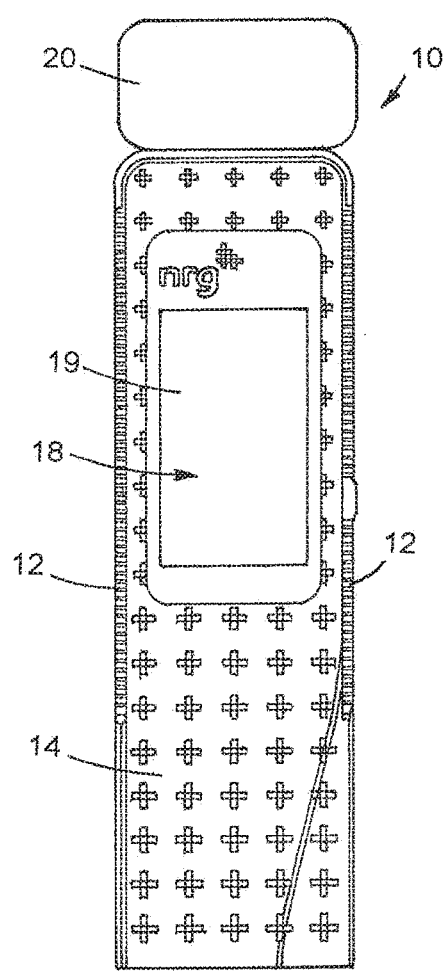
FIGS. 3 and 4 is a front view of another preferred embodiment of vending kiosk according to the present invention.
Figure 4:
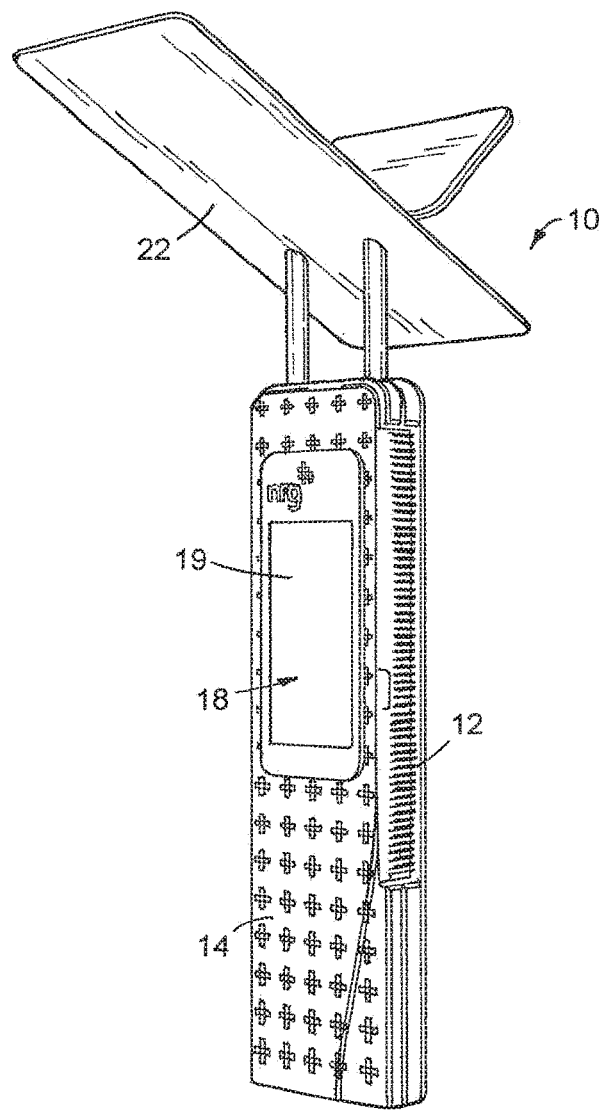

FIGS. 3 and 4 show other embodiments of the kiosk 10. The kiosk 10 in FIG. 3 has a header 20 mounted to the top of the outer housing assembly 14. The header 20 may be a decorative lighted header or a header providing public announcement and/or advertising functions. In FIG. 4, a solar panel 22 is mounted to the top of the outer housing assembly 14 to provide renewable energy to the kiosk 10. The kiosk 10 with solar panel 22 may be desirable for outdoor use.

Figure 5:
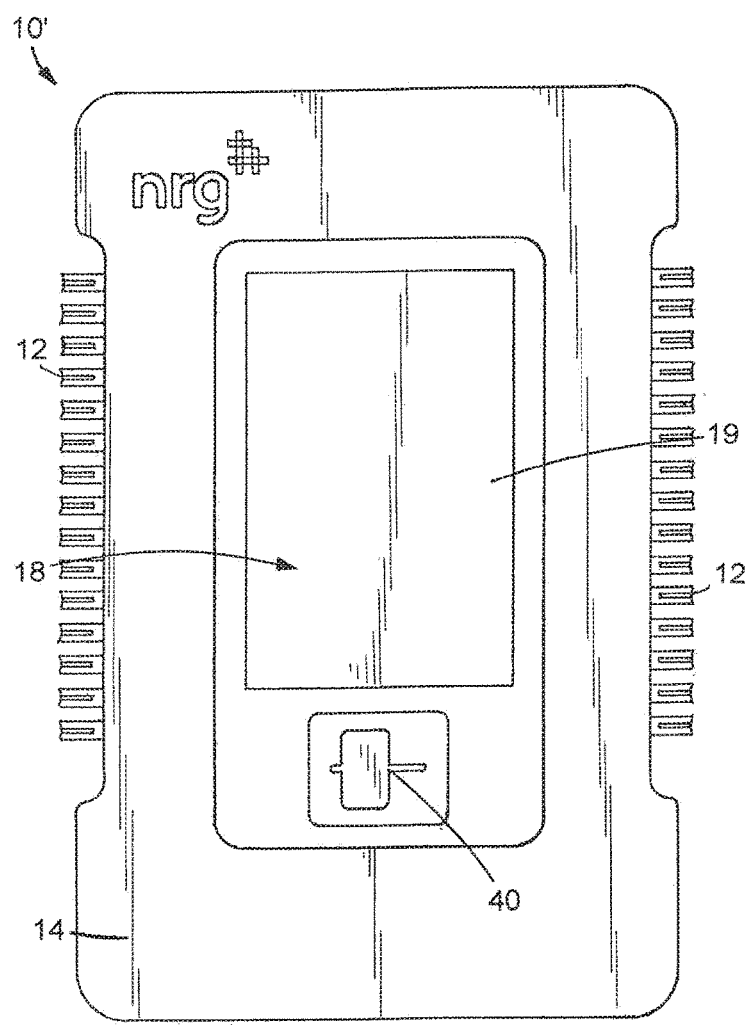
FIGS. 5 and 6 are front and side views, respectively, of a mini kiosk embodiment according to the present invention
Figure 6:
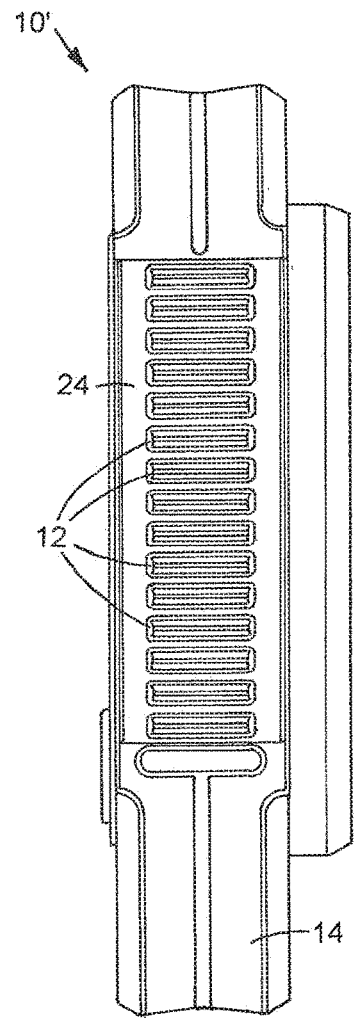

Multiple sizes of kiosks 10 may be desired, for example, based on location or needed capacity. FIGS. 5 and 6 show another embodiment of the kiosk 10' arranged and designed to be mounted to or within a wall, eliminating the need for the base plate 16. The kiosk 10' is a mini kiosk that is smaller in size than the kiosks of FIGS. 1-4. The mini kiosk 10' may be desirable at locations where the needed quantity of power packs is small or the space is limited. Alternatively, a mini kiosk 10' may have a stand allowing it to be freestanding as opposed to being wall-mounted. The present invention is not limited to the kiosk shapes and configurations shown in the attached figures. It is to be understood that the following discussion pertaining to the kiosks is intended to apply generally to all types and sizes of kiosks according to the principles of the preferred embodiment of the present invention. Thus, references to kiosk 10 are intended to also apply to kiosk 10' unless noted otherwise.

Figure 7:
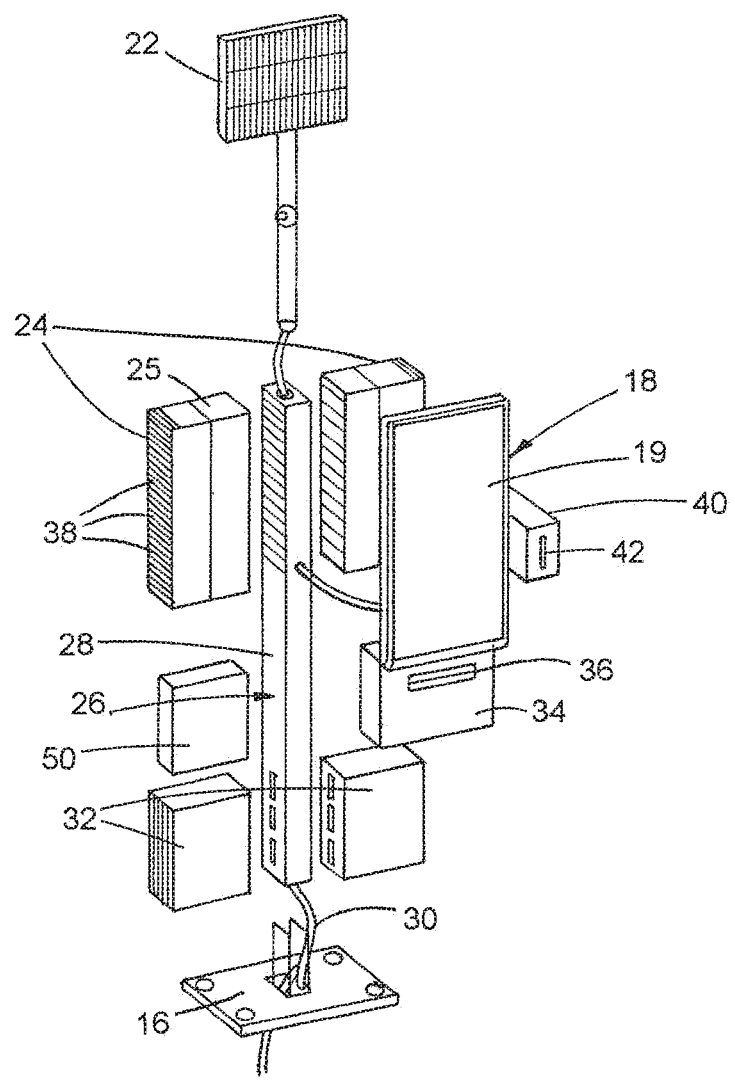
FIG. 7 is an exploded view of the inner structure of the kiosk in accordance with the principles of a preferred embodiment of the present invention.

FIG. 7 is an exploded view of the inner structure of one embodiment of the kiosk 10 in accordance with the present invention. It is to be understood that the inner structure shown in FIG. 7 is merely exemplary and is not intended to be limiting of the inner structure of the kiosk. The kiosk 10 preferably includes an internal computer 50 that locally controls several functions at the kiosk 10 as will explained below. The kiosk 10 further includes at least one user interface portion 18. The user interface portion 18 preferably comprises a display monitor 19 incorporating known touch screen technology with configurable messaging. The touchscreen 19 is preferably legible in full sunlight. As such, it presents a visual display of pertinent information to customers and operates as a user interface permitting customers to communicate with the kiosk 10 and/or the central management operation 102 in communication with the kiosk 10.

One preferred embodiment of the kiosk 10 includes a front panel having existing "touch through glass" technology utilizing a full length glass front. The glass has two layers—the inner layer being cutout to accommodate a closer proximity for the touch technology to the outer surface and an outer layer that remains fully intact.

Preferably, the user interface portion 18 of the kiosk 10 further includes a card reader 40 (FIG. 7) to read magnetically encoded credit cards or debit cards, for generating payment information. In some embodiments, the magnetically encoded cards may comprise membership cards. As shown in FIG. 7, the card reader 40 preferably includes a card slot 42 for receiving the card. The card slot 42 is preferably located adjacent or near the touch screen 19 of the user interface portion 18 on the front of the kiosk 10. It is to be understood that the card reader 40 is preferably designed in known fashion to read magnetically encoded or smart chip (EMV) encrypted data prior to authorizing the customer access to a power pack 12 in the kiosk 10. EMV stands for Europay, MasterCard and Visa, a global standard for inter-operation of integrated circuit cards ("IC cards") and IC card capable point of sale terminals and automated teller machines for authenticating credit and debit card transactions.

In some embodiments, the kiosk 10 is equipped to also accept currency. In some embodiments, the kiosk 10 may not require any physical payment acceptance means, but shall accept payment over secure internet or contactless payment methods through a mobile app on the customer's device. Contactless payment methods include, for example, Apple Pay, Google Wallet, and other methods such as QR code readers.

Although not shown in the figures, it may be desirable to have a second user interface portion 18 in the kiosk 10. For example, the second user interface portion 18 could be added to the back of the kiosk 10. Alternatively, the back of the kiosk 10 could be equipped to display advertising, promotions or other information via a display monitor.

Referring to FIG. 7, the kiosk systems tower 26 includes wiring 30 run within the upright structural member 28. The wiring 30 is connected to a power source, typically a 120 VAC power source. In installations where the kiosk 10 is being permanently installed, the wiring 30 may extend through the base plate 16 for connection to the power source. Alternatively, the power cord may extend from the kiosk 10 at other locations.

Preferably, the kiosk 10 includes at least one back-up battery 32 within the outer housing assembly 14. In the event of a temporary power outage to the kiosk 10, the back-up battery 32 can provide the kiosk 10 with power temporarily to allow some customer usage even during such situations. This back-up battery power source 32 can easily and frequently be switched to during power outages, without interrupting kiosk operation, to continue service for customer usage.

In one preferred embodiment, the kiosk 10 includes an overflow return module or an overflow bin 34 contained within the outer housing assembly 14 (FIG. 7). The overflow bin 34 includes an overflow slot or opening 36 for receiving returned power packs 12. Preferably, access to the overflow slot or opening 36 only becomes available to a customer when there is no available empty power pack shelf or slot 38 in the magazines 24 for reasons which are discussed below.

Referring to FIGS. 1-7, the power packs 12 are preferably accessed at the sides of the kiosk 10. It is to be understood that the invention is not limited to such side access. The kiosk 10 is preferably modular in design and includes one or more magazines 24, each adapted to contain a plurality of power packs 12. Preferably, the magazines 24 are modular and the same magazine 24 can be used across multiple sizes of kiosks to insure operational efficiency and ease of design. For example, the pair of magazines 24 in the mini kiosk 10' of FIGS. 5 and 6 each contain a maximum of fifteen (15) power packs. Preferably, other sizes of kiosks would use multiples of the same size magazine 24 as used in the mini kiosk 10'. Thus, a mid-size kiosk may have two magazines 24, one stacked above the other, on each side of the kiosk and a large-size kiosk may have three or four stacked magazines 24 on each side of the kiosk, with every magazine being interchangeable with any other magazine. It is to be understood that the number of power packs 12 capable of being received in a magazine 24 is a matter of design choice.

Figure 9:
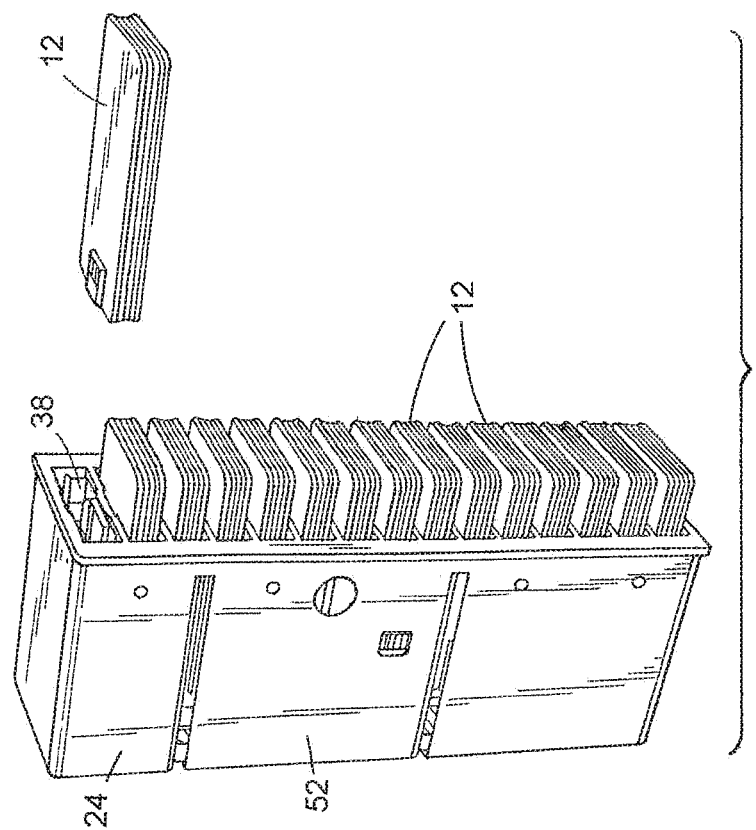
FIG. 9 is a side and front perspective view of the magazine of FIG. 8 showing a power pack removed from the magazine.
Figure 8:
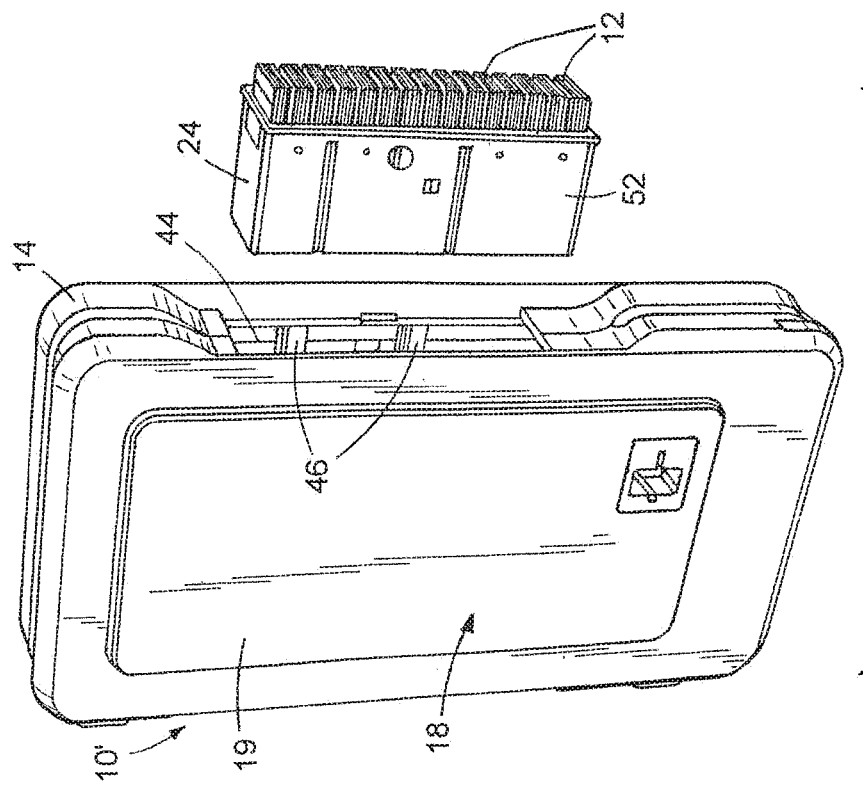
FIG. 8 is a front and side perspective view of another preferred embodiment of vending kiosk according to the present invention showing a magazine removed from the kiosk.
Figure 10:
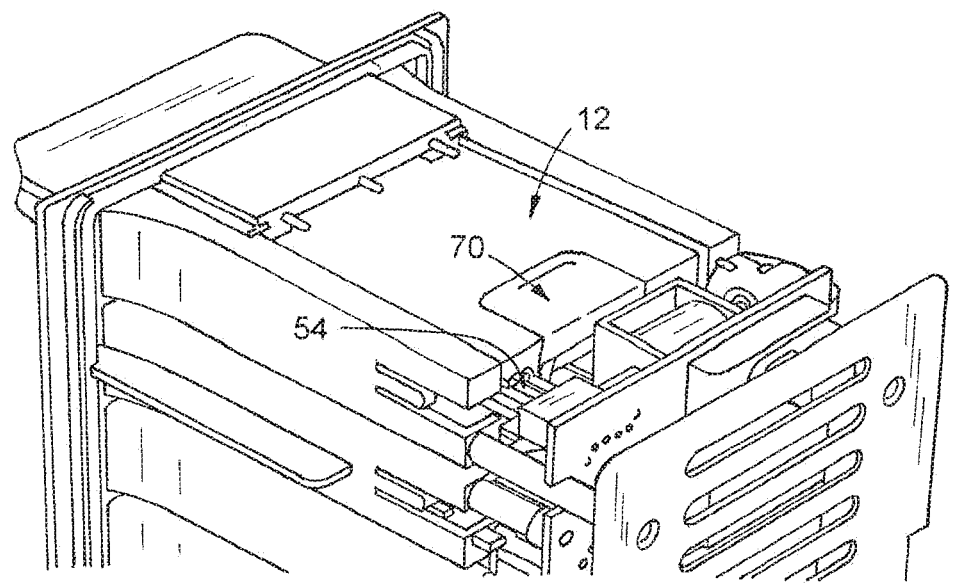
FIG. 10 is a partial perspective view of the magazine of FIG. 8 with the casing assembly of the magazine removed.

A preferred embodiment of the modular magazine 24 will be discussed with reference to FIGS. 8-10. Each magazine 24 includes a casing assembly 52 and a plurality of shelves or slots 38. Each slot 38 is adapted and configured to receive one power pack 12 as shown in FIG. 9. Preferably, each magazine 24 slides in and out of the kiosk 10 through a side opening 44 in the outer housing assembly 14 as shown in FIG. 8. It is to be understood that various means known by one of ordinary skill in the art may be used to slidably receive the magazine 24 in the kiosk 10. Each magazine 24 may be guided into the side opening 44 via one or more pairs of generally spaced and parallel cooperating guide rails 46 positioned within the outer housing assembly 14 and on the magazine outer casing 52 to facilitate installation and removal of the magazine 24. The magazines 24 are preferably manually slid into and out of the kiosk 10, as desired, for installation and maintenance by service personnel.

Upon full insertion of the magazine 24 into the kiosk 10, the magazine 24 is locked in place to prevent removal or tampering by unauthorized personnel. In one embodiment the magazine 24 is locked to an internal upright structural member 28 of kiosk systems tower 26 (FIG. 7). In another embodiment shown in FIG. 11, the magazine 24 is locked within the kiosk 10 via a locking mechanism 48, preferably a conventional rotational lock, preventing removal of the magazine 24 when in a locked position. The magazine 24 includes a lock engager 51 on the exterior of the magazine casing assembly 52 which precludes removal of the magazine 24 when the lock 48 is in the locked position. The lock 48 has a key for locking/unlocking by the maintenance personnel. The lock 48 is accessed from the back of the kiosk 10 and there is a separate lock 48 for securing each magazine 24.

The kiosk 10 includes a charging unit 25 responsible for recharging the power packs 12 received in the slots 38 of the magazine 24. In one embodiment, the charging unit 25 is included in the magazine 24 (FIG. 7). Alternatively, the charging unit 25 may be separated from the magazine 24 and remain within the kiosk 10 when the magazine 24 is removed. In one embodiment, the charging unit 25 and/or magazine 24 include electrical contacts for making physical contact with each power pack 12 received in the slot 38 for metal-to-metal connection conductive charging. In another embodiment, the charging unit 25 and magazine 24 cooperate to inductively charge the power packs 12. Preferably, the charging unit 25 can charge power packs 12 individually or multiple power packs 12 simultaneously.

In the preferred embodiment, a data/power interface 56 exists between the kiosk 10 and the installed magazine 24. The data/power interface 56 comprises a pair of mating, releasable connectors, for example a 4-pin Molex male/female connector. This is a common mechanical connector with the male connector having four metal pins and the female connector having four sockets enclosed in a plastic housing. Preferably, two pins are for data communication and the other two pins are for power, typically 24 VDC power. Preferably, there is one connector mounted at the rear of the magazine 24 that aligns with the mating connector in a fixed position inside the kiosk 10. As the magazine 24 is inserted in the kiosk 10 the male and female connectors axially mate and form the data/power interface 56 (FIG. 11).

FIGS. 12-17 show a preferred embodiment of the power pack 12. The power pack 12 includes a main body 71 and a device connector assembly 70. The main body 71 includes an outer case 78 having a substantially rectangular prism shape with upper and lower surfaces 78a and 78b, first and second side surfaces 78c and 78d, and front and rear end surfaces 78e and 78f, respectively. The outer case 78 defines a case opening 79 in the upper surface 78a and rear end surface 78f.

Figure 15:
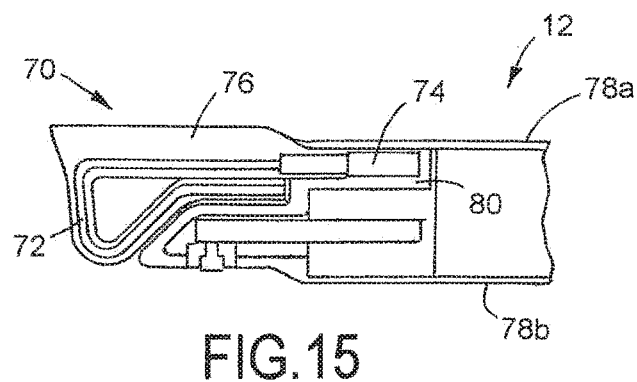
FIG. 15 is a section view of a device connector assembly of the power pack of FIG. 12 shown in a stored position.

FIGS. 12-15 show the device connector assembly 70 in its stored position, FIGS. 16 and 17 show the device connector assembly 70 in its "ready to connect" position, and FIG. 17A shows the device connector assembly 70 connected to the portable electronic device P, such as a smartphone. As shown in FIG. 15, the connector assembly 70 preferably comprises a preformed substrate 72, a connector 74 with wiring (not shown), and an out layer 76. The outer case 78 of the main body 71 of the power pack 12 includes a receptacle 80 for storing the connector 74 in the stored position. The preformed substrate 72 is preferably a bent or curved portion having a slight amount of flexibility while remembering its preformed shape. The preformed substrate 72 may be a plastic or metal. Preferably, the outer layer 76 is a soft overmold comprising a thermoplastic polyurethane (TPU). The preformed substrate 72 is flexible for different heights, holds the wiring in place when insert molding the TPU and holds the soft TPU outer layer 76 in a "C" shape—which is better for storage and connecting to a device such as a phone. Preferably, the connector 74 is substantially parallel to the upper surface 78a of the outer case 78 when in the "ready to connect" position, to facilitate connecting with portable electronic device P as shown in FIGS. 17 and 17A. Molding the connector assembly 70 into the "C" shape means the connector 74 naturally remains in one of its two functional positions: storage position or ready to connect position. Alternatively, the preformed substrate 72 may not be required. The TPU may be molded in the curved or bent position allowing it to naturally hold its form, while also acting as a hinge to allow the connector 74 to be tucked away in the stored position.

Figure 13:
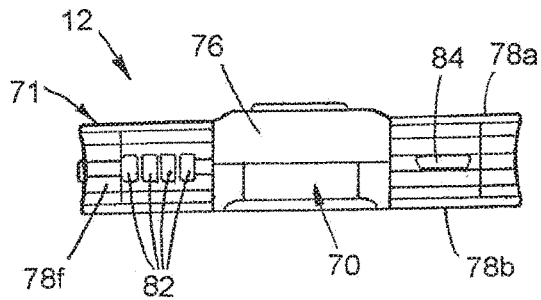
FIG. 13 is a back view of the power pack of FIG. 12.
Figure 14:
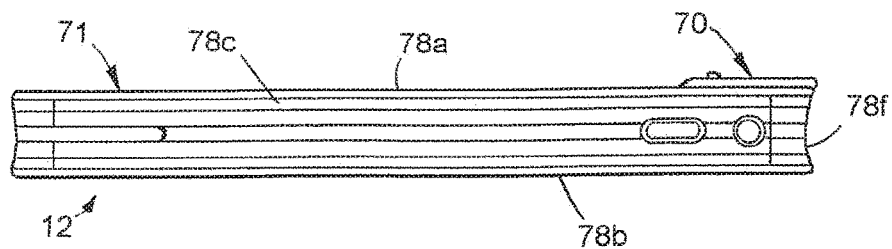
FIG. 14 is a side view of the power pack of FIG. 12.

Preferably, in the stored position the connector assembly 70 does not extend below the lower surface 78b and beyond the rear end surface 78f of the outer case 78. However, in the preferred embodiment the connector assembly 70 is slightly raised relative to the upper surface 78a in the stored position as shown in FIGS. 13-15. The connector assembly 70 is easily released from the stored position by pushing the outer layer 76 rearwardly and sliding the connector 74 out of the receptacle 80. As shown in FIG. 15, the connector 74 is preferably substantially parallel to the upper surface 78a of the power pack main body 71 when the connector assembly 70 is in the stored position. Upon the connector 74 clearing the upper surface 78a at the case opening 79, the preformed connector assembly 70 elevates to the raised or "ready-to-connect" position shown in FIGS. 16 and 17.

It is to be understood that the required connector 74 varies between different portable electronic devices, such as smartphones P. For example, a different connector 74 is required for each of the iPhone 5, iPhone 4 and Android phones. As a result, power packs 12 with different connectors 74 may be provided from a kiosk 10. Preferably, each of the power packs is identical with the exception of the connector 74. In one embodiment, a field service technician is capable of replacing one connector with another type of connector to change the type of power pack 12. For example, the field service technician can replace an iPhone 4 connector with an Android connector.

In one preferred embodiment, each power pack 12 is a "smart" pack. The smart pack 12 may record or convey various information. For example, the smart pack 12 may record information such as the number of times the power pack 12 has been recharged for purposes of monitoring the useful life of the individual power pack 12. The smart pack 12 may also include active subscription detection to enable and disable providing power/charging when a user passes the rented power pack 12 to a third party for further use. The smart pack 12 may include the ability to communicate with the customer's device, via wired or wireless technologies, to verify customer account status, mobile app installation, device type, etc.

In a preferred embodiment, the kiosk 10 communicates with the power pack 12, while in the kiosk 10, to retrieve power pack data to determine cycle life, battery health, performance, etc. In one embodiment the power pack 10 communicates with the customer's device during use via a power pack app installed on the customer's device to display information related to charge life, time-to-charge, kiosk locations, etc. Additionally, in one preferred embodiment the power pack app allows a customer to reserve or pay for a power pack rental or purchase at a kiosk location convenient to the customer.

Following is a brief overview of the mobile application and how it works for customers in one preferred embodiment. The user downloads the mobile app to the user's device, typically, for example a smartphone P. The app includes a map feature identifying kiosk locations. The user can use the map feature in the app to find a kiosk 10 nearest to the user's location or other desired destination kiosk (i.e., airport, mall, etc.). The user could then proceed to that kiosk 10 to interact with the kiosk user interface 18, or could use the mobile app to reserve a power pack 12 at that specific kiosk 10. Preferably, the user pays via electronic payment such as Credit Card, Paypal, Apple Pay, Google Wallet, etc. When the user arrives at the specific kiosk at which the user has a power pack reservation, the user inputs his or her identifier (e.g., email address, phone number, or reservation number, etc.) to retrieve his or her reserved power pack 12. The kiosk user interface 18 then instructs the user to retrieve the power pack 12 in the same way as a rental transaction discussed herein. Additionally, the mobile app can allow the user to view and/or edit their power pack rental history, favorite kiosk locations, preferred payment method, custom low-battery alarms, notification settings, etc.

In the preferred embodiment, each power pack 12 has its own unique identifier to enable sophisticated tracking and logging of individual power packs 12. The unique identifier may include, for example, a computer readable code, an electronic tag, a color or text pattern, MAC address (WiFi, Bluetooth, or other RF technology), IP address, or any other type of identification feature. Preferably, each of the power packs 12 includes an internal memory chip on a printed circuit board having the stored unique identifier. Additionally or alternatively, the unique identifier may be affixed, adhered, attached or secured to, or screened or laser printed on, the outer case 78 of the power pack 12. In a preferred embodiment, the unique identifier of the power pack 12 is read or determined at the kiosk 10 upon return of the power pack 12, preferably upon insertion into the slot 38 in the magazine 24. Preferably the kiosk 10 does not read a visual tag on the outer case 78 of the power pack 12, but instead reads the unique identifier through a serial communication port (the four pin conductive contactors) discussed below.

Since each kiosk 10 has a finite number of magazine slots 38, the kiosk 10 preferably has an overflow bin 34 and an overflow slot 36. If a customer returning a vended power pack 12 approaches a kiosk 10 that has every magazine slot 38 filled with a power pack 12, the customer is instructed via the user interface portion 18 to insert the power pack into the overflow slot 36. Preferably, a mechanical actuator opens an overflow slot door 35 (FIGS. 1 and 2) allowing the customer to insert the returned power pack 12 into the overflow bin 34. When the power pack 12 is inserted into the overflow bin 34, the customer's rental record is updated as "return claimed" until one of the field service personnel visits the kiosk 10 to unload the overflow bin 34. Upon verification of the returned power pack, the customer's rental record is updated to reflect that the power pack was returned. The overflow slot/bin functions simply to collect power packs 12 when the kiosk magazine slots 38 are all full.

Preferably, each slot 38 is sized to receive and guide each power pack 12 such that upon full insertion of the power pack 12 into the slot 38, the power pack 12 is mechanically connected to the charging unit 25 in the kiosk 10. For example, a pair of charging pins positioned at uniform fixed locations within each slot 38 may engage a pair of pin receivers in the battery pack 12 upon full insertion of the power pack 12. Another example is a pair of contacts of the magazine/charging unit physically contact a pair of exposed contacts on the power pack 12 upon full insertion in the slot 38. Alternatively, wireless or inductive charging may be accomplished by controlling the placement of the power pack 12 relative to charging coils.

With reference to the preferred embodiment of FIGS. 13 and 17, the power pack 12 includes a plurality of contact pads 82 arranged and designed to interface with the magazine 24. In the illustrated embodiment, four contact pads 82 are provided. The contact pads 82 are preferably on the rear end of the power pack 12 adjacent the device connector assembly 70. With reference to FIGS. 10 and 11, each slot 38 of the magazine 24 has a plurality of "pogo pins" or pins 54 that contact the metal contact pads 82 on the power pack 12 upon insertion of power pack 12. In the preferred embodiment, four pogo pins 54 are provided to contact the four contact pads 82. Two pairs of pogo pins and contact pads are for power, and the other two pair are for data communication. It is to be understood that other quantities or uses of pads/pins may be used. For example, five pads/pins with three pair for power and two pair for communication may be desired. Alternatively, it may be desired to have four pair of pads/pins with three pair for power and one pair for communication.

In the preferred embodiment, the data onboard the power pack 12 is read via 12C (serial communication protocol). When the power pack 12 is inserted into the magazine 24, the conductive contacts of the power pack 12 mate, contact or flush up to the conductive contacts of the slot 38 in the magazine 24. Preferably, each power pack 12 and slot 38 has four conductive contacts—two for power to recharge the power pack 12 and two for data transfer. In a preferred embodiment, the power pack 12 communicates its unique identifier and connector type, charge level and current temperature.

In one embodiment, the power pack 12 includes a micro USB input port 84 for home charging. In another embodiment, the power pack 12 includes a light strip 88 (FIG. 16) on the outer case 78. The light strip 88 can be used to show the user upon making a transaction which power pack 12 to take from the kiosk 10. For example, the light strip 88 may be individually illuminated to show the user which power pack 12 to take. Additionally or alternatively, when the power pack 12 is not in the kiosk 10, the light strip 88 may be used to show the current power level of the power pack 12.

As discussed above, in one preferred embodiment the power packs 12 all have the same physical size such that any vended power pack 12 can be received in any unoccupied slot 38 of the magazine 24. Although the connector 74 may vary, each power pack 12 is adapted to be received and re-charged in any magazine slot 38.

Preferably, the power packs 12 and magazine slots 38 are arranged and designed so that the power packs 12 can only be inserted into the slots 38 in the correct orientation. In one embodiment, each power pack 12 and magazine slot 38 has functional design features (i.e., protrusions or other geometry) that prevent the power packs 12 from being inserted into the magazine 24 with improper orientation (i.e., oriented backwards or upside down). In one embodiment, the power pack 12 has a small protrusion 58 (FIG. 16) that makes the power pack width slightly larger than the slot width to prevent backwards insertion. The magazine slots 38 may have a protruding pad at the top of the slot 38 to prevent the power pack 12 from being inserted upside down. It is to be understood that there are several techniques that are suitable for assuring that the power pack 12 is properly inserted and the above are merely examples which are not intended to be limiting.

Preferably, upon full insertion into the slot 38, the power pack 12 is prevented from being removed from the magazine 24 without authorization. In one embodiment the power pack 12 is locked to the magazine 24 upon full insertion. Various means may be utilized to lock the power pack 12 to the magazine 24. As one example, a locking pin within the slot 38 may be inserted through an opening or recess in the power pack 12 to prevent removal. Another example comprises providing a door or gate that covers the slot 38 upon full insertion of the power pack 12. In another embodiment, upon full insertion of the power pack 12, the power pack 12 is flush with or recessed within the kiosk 10 such that the power pack 12 cannot be grasped.

Figure 11A:
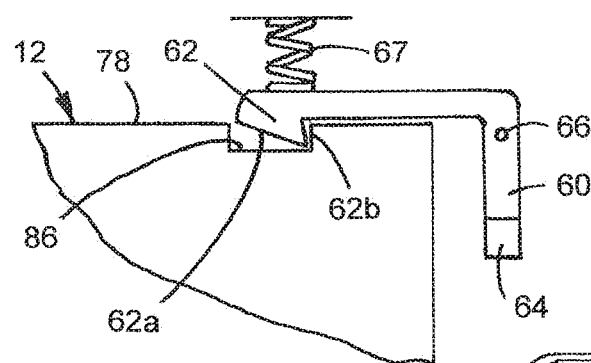
FIG. 11A is a top view of the locking member shown in FIG. 11, and showing the insertion of a locking tab of the spring-biased locking member in a cavity of the outer case of the power pack.
Figure 11:
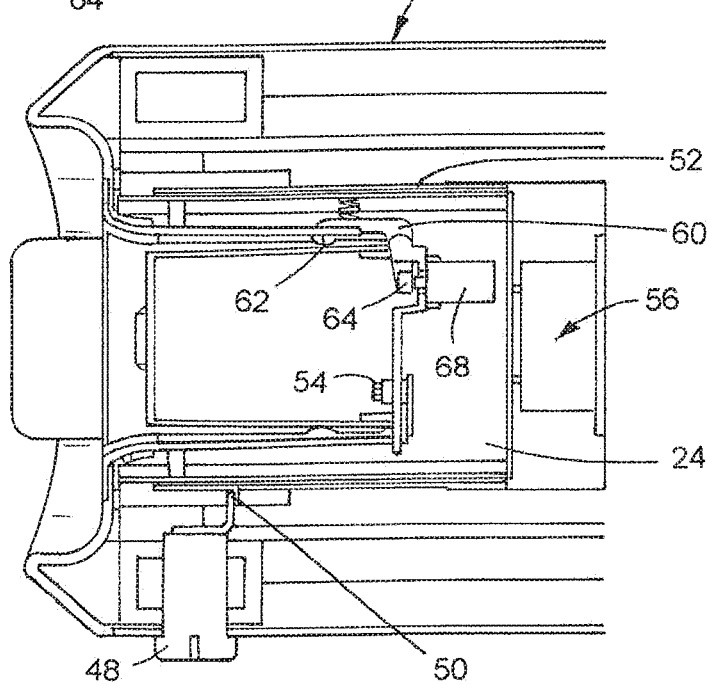
FIG. 11 is a top view of an alternative embodiment of the magazine with the top of the magazine casing assembly removed.
Figure 12:
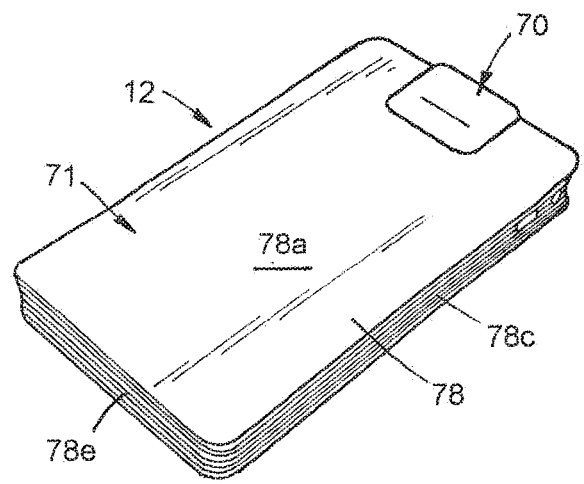
FIG. 12 is a perspective view of a power pack according to a preferred embodiment of the present invention.

One preferred embodiment for locking the power pack 12 to the magazine 24 is shown in FIGS. 11 and 11A. Each of the slots 38 includes a generally L-shaped locking member 60 having an inwardly protruding locking tab 62 near one end of the locking member 60. The locking tab 62 includes a first slanted surface 62a and a second angulated surface 62b. The locking member also includes a push pad 64 and a pivot point 66 as shown in FIG. 11A. Preferably, the locking member 60 is pivotally mounted to the magazine 24 and is biased, preferably via a spring 67 to the position shown in FIG. 11. The outer case 78 of the power pack 12 includes a cavity 86 (FIGS. 11A and 16) arranged and designed to receive the locking tab 62 upon insertion of the power pack 12 into the slot 38 as shown in FIG. 11A. As the power pack 12 is slid into the slot 38, the power pack outer case 78 contacts the first slanted surface 62a of the locking tab 62 and causes the biased locking member 60 to pivot about the pivot point connection 66. Upon full insertion the cavity 86 receives the aligned inwardly protruding locking tab 62. The locking tab 62 is forced into the cavity due to the spring-bias. At this point the power pack 12 is locked within the slot 38 and the contact pads 82 are in contact with the pins 54. The sharply angulated surface 62b of the locking tab 62 prevents removal of the power pack 12 when in the locked condition.

An actuator or solenoid 68, mounted in the magazine 24, is positioned adjacent to the push pad 64 of the locking member 60. When a customer is instructed to take a power pack 12, the solenoid 68 pushes on the push pad 64 and pivots the locking member 60 which removes the locking tab 62 from the cavity 86. At this point the power pack 12 can be removed from the slot 38. Preferably, each slot 38 has its own solenoid 68.

In a preferred embodiment, the kiosk 10 does not move the power pack 12 at any time. When the power packs are returned or loaded into the magazine, the user places it manually into place, where it is mechanically locked and charged. Additionally, when the user is instructed to take a power pack, the solenoid moves the locking member 60 to allow the power pack 12 to be taken. However, if the user does not take the power pack 12, the solenoid can be withdrawn and the biased locking member 60 locks the power pack 12 once again.

In a preferred embodiment, the kiosk 10 includes a network communications module 112 (FIG. 18) having a network card such as an Ethernet card. Each of the kiosks 10 on the network 104 is configured to use the TCP/IP protocol to communicate via the network 104. A person of skill in the art understands, however, that a variety of network protocols could also be employed, such as IPX/SPX, Netware, PPP and others. Preferably, the kiosk 10 has a broadband connection to the network 104, however, wireless network connections are also contemplated, such as wireless Ethernet, satellite, infrared, cellular/machine-to-machine telecommunications, and radio frequency networks.

The computer 50 in the kiosk 10 is configured to transmit information to, and receive information from, the network 104. While the Internet is preferred for interconnecting the network of kiosks 10, the invention is not so limited and may be any network for placing the kiosks 10 in communication with the central management operation 102.

The central management operation 102 is responsible for communicating with the kiosk controller 50 via the network 104. The central management operation 102 is preferably located at a central location that is remote from the plurality of kiosks 10. The central management operation 102 operates as the server for communicating over the network 104 between the plurality of kiosks 10. The central management operation 102 receives communication from and transmits information to the kiosks 10. For example, when a power pack 12 rental transaction is performed at a kiosk 10, transaction data such as the rented power pack unique identifier is then transmitted from the kiosk 10 to the central management operation 102 via the network 104.

In one embodiment, when a customer uses the user interface portion 18 of the kiosk 10 to request a particular type of power pack 12, the kiosk controller 50 determines which slots 38 in the magazines 24 contain the requested charged power pack 12. Preferably, each magazine slot 38 within the kiosk 10 has a slot identification number or slot ID. In one embodiment, the controller 50 sends a signal to the magazine 24 indicating which power pack 12 the customer is allowed to remove from the magazine 24. The controller 50 signals for the selected power pack 12 to be unlocked from the magazine 24 and signals that a lamp 88 (FIG. 16) on the selected power pack 12 or a lamp adjacent to the selected power pack 12 be illuminated. This informs the customer as to which power pack 12 the customer can remove. Upon removal of the power pack 12 from the magazine 24, the magazine 24 senses the removal of the power pack 12 and the information is transmitted to the central management operation 102. In one embodiment, the kiosk controller 50 maintains and updates a database indicating for each slot 38 in the kiosk's magazines 24 the following information: whether or not it has a power pack 12, the power pack unique identifier, the charge status, and the power pack type. This allows the kiosk controller 50 to provide the appropriate power pack 12 to the customer. Some or all of this information is conveyed to the central management operation 102. In one embodiment, the magazine 24 continually polls all of its slots 38, preferably at a high frequency, to detect the presence of a power pack 12. If a slot 38 has a change in power pack presence, the magazine 24 communicates that status change to the kiosk computer 50 then to the central management operation 102, which updates the appropriate database records (inventory, customer record, etc.).

In one embodiment, the kiosk controller 50 controls the recharging of each of the returned power packs 12. Preferably, power is constantly provided to each magazine 24 and the kiosk computer 50 instructs the magazine 24 which power pack 12 to provide power to. The kiosk computer 50 and/or central management operation 102 algorithmically prioritizes the order of which power packs 12 should receive recharging. The charging system design and logic within the kiosk 10 steps down the voltage requirements and allows for rotational charging of each of the magazines 24. The logic detects which of the power packs 12 is going to become available first and focuses the charging effort. As one example, consider the scenario where two power packs 12 are returned. One is returned 50% charged while the other is returned 10% charged. If the kiosk 10 was only able to recharge one at a time, the power pack 12 at 50% would receive priority to receive a recharge over the 10% charged power pack 12 since it will take less time to fully charged and available for rental.

Preferably, the kiosk 10 is capable of charging multiple power packs 12 in all magazines 24 simultaneously during period of peak consumption. Preferably, the kiosk computer 50 is programmed to decide which power packs 12 should be charged. Since charging causes a build-up of heat it may be desirable to spread out the charging zones and avoid solid clusters within the kiosk 10. For example, the rule may be not to charge three adjacent power packs 12 simultaneously. Preferably, the central management operation 102 is able to implement and modify the rules.

Although not shown, it is to be understood that depending on the number of transactions, number of kiosks 10, and/or the geographical extent of their locations, more than one central management operation 102 may be implemented in communication with a router to improve the speed and efficiency of the system 100. In such a case the plurality of central management operations 102 are in communication with the router and the router receives communication from the network 104 and distributes the communication to one of the plurality of central management operations 102. Similarly, when one of the central management operations 102 transmits information, that information is received by the router and then transmitted to the network 104.

In one embodiment, the central management operation 102 includes one or more central controllers 106 in communication with at least one central database 108 as shown in FIG. 19. The central database 108 stores several types of information relating to the system 100. For example, the central database 108 stores data regarding each power pack 12, the inventory of power packs 12 at each kiosk 10, customer information, and rental transaction information. The central database 108 may include a power pack database 108a for storing power pack information for every power pack 12 distributed in the power pack vending system and a customer database 108b for storing customer information for the power pack vending system.

The central database 108 is preferably capable of being shared between a plurality of central controllers 106 and its information is also preferably capable of being transmitted via the network 104. Preferably, the central database 108 includes a blend of database technologies, such as relational and non-relational databases.

The network communications module 112 can be configured to communicate with another entity on the network 104. The network communications module 112 can be configured to communicate with the central server 110 of the central management operation 102 across the network 104, such as, for example, across the internet, and can include features configured for wired or wireless communication.

The network communications module 112 may be configured to transmit information to the central server 110 relating to the identification of a user, to the purchase by the user, to user payment details, and any other desired information. The central server 110 can determine which, if any, account is associated with the user, and provide account information to the kiosk 10.

In some embodiments, when the user makes a payment at the kiosk 10, the kiosk 10 provides information relating to the payment to the central server 110. For example, this information can include the amount of payment, payment account information such as a credit card or bank card number or identifier, or any other payment information. The central server 110 can then associate this payment information with the user account stored on the central database 108.

In some embodiments, the kiosk 10 provides information relating to the power pack or packs 12 rented by the user. For example, the unique identifier of each vended power pack 12 and the associated customer identifier or payment account information, or any other desired information, is transmitted to the central controller 106 and stored on the central database 108. Additionally, upon the customer returning the power pack 12 the kiosk 10 transmits this information so that it can be associated with the customer's account to indicate the rented power pack 12 has been returned by the customer.

Preferably, the network communications module 112 can communicate information to the central server 110 relating to the status of the kiosk 10. Thus, in some embodiments, the network communications module 112 can send a signal to the server 110 when the kiosk 10 requires servicing such as, for example, to replenish the stock of available power packs 12, to remove power packs 12 deposited in the drop-off box 34, to indicate a malfunction of the kiosk 10 such as failure of a charging unit 25 to charge the power packs 12, or any other required service. A person of skill in the art will recognize that the network communications module 112 can communicate a variety of other information to the server 110, and that the present disclosure is not limited to the above-described specific embodiments.

Additionally, the touchscreen 19 may allow service or stocking personnel to communicate with the computer 50 within the kiosk 10 and/or central management operation 102 during servicing or inventory stocking of the kiosk 10 (i.e., the "Maintenance Mode"). In another embodiment, the service or stocking personnel communicate with the internal computer 50 in the kiosk 10 and/or central management operation 102 via their portable devices.

Preferably, the "Maintenance Mode" is a "smart" operation that gives service personnel a simple, instructive interface to prevent erroneous servicing and minimize maintenance visit times. In the Maintenance Mode operation, the kiosk computer 50 and touchscreen 19 may provide information in a visual indicator method to inform service personnel which power packs 12 and magazines 24 need to be removed/replaced. Additionally or alternatively, the central management operation 102 and/or kiosk computer 50 could send commands to the power packs 12 and/or magazines 24 to illuminate those that are properly functioning with the service personnel being instructed to remove the power packs 12 and/or magazines 24 that are not illuminated. For example, the kiosk software provides service personnel step-by-step instructions on how to service the kiosk 10. The kiosk software commands all "good" power packs 12 and/or magazines 24 to be fully illuminated while the "bad" power packs 12 and/or magazines 24 remain unlit. Service personnel are instructed to remove all of the unlit items and replace with new inventory. The illumination/removal process is conducted at the start and end of each maintenance visit.

Figure 20:
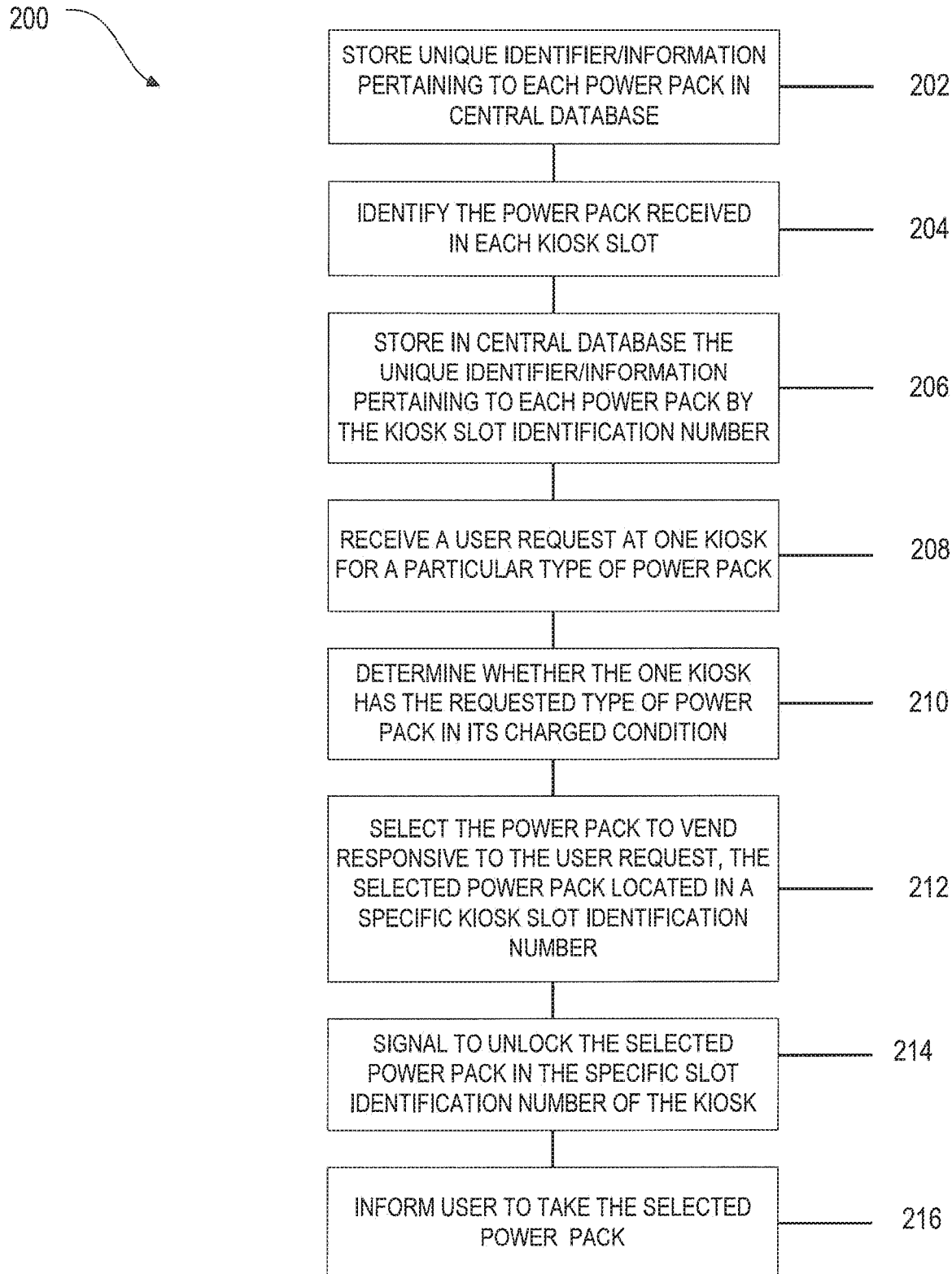
FIG. 20 is a flow diagram showing a method of operating the power pack vending system according to one embodiment.

FIG. 20 shows a method 200 of operating the power pack vending system 100 having a central management operation 102 and a plurality of kiosks 10, each kiosk 10 having a plurality of slots 38 and a plurality of rechargeable power packs 12, each slot 38 arranged and designed to receive a power pack 12, and each power pack 12 having a unique identifier and each slot 38 having a slot identification number.

At 202, the central management operation 102 stores unique identifier and information pertaining to each power pack 12 in a central database 108, and the power pack received in each kiosk slot 38 is identified at 204. At 206, the unique identifier and information pertaining to each power pack 12 by the kiosk slot identification number is stored in the central database 108.

At 208, a user request for a particular type of power pack 12 is received at one kiosk 10. At 210, a determination is made whether the one kiosk 10 has the requested type of power pack 12 in its charged condition. Selection of the power pack 12 to vend, responsive to the user request, located in a specific kiosk slot identification number occurs at 212. At 214, a signal to unlock the selected power pack 12 in the specific slot identification number of the kiosk 10 is sent, and the user is informed to take the selected power pack 12 at 216.

Figure 21:
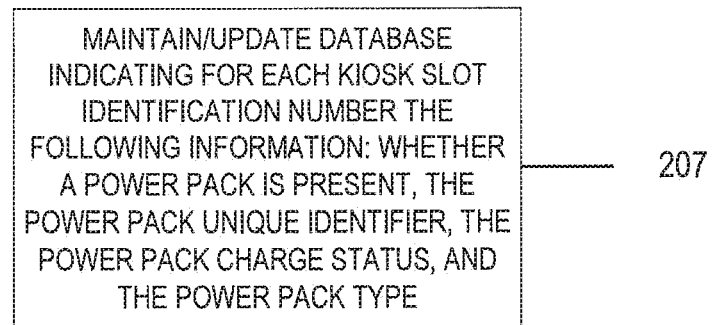
FIGS. 21-24 are flow diagrams showing methods of operating the power pack vending system according to various embodiments of the invention.

In one embodiment, the step 206 of storing in the central database the unique identifier and information pertaining to each power pack by the kiosk slot identification number comprises maintaining and updating a database indicating for each kiosk slot identification number the following information: whether a power pack is present, the power pack unique identifier, the power pack charge status, and the power pack type as shown in FIG. 21 at 207.

Figure 22:
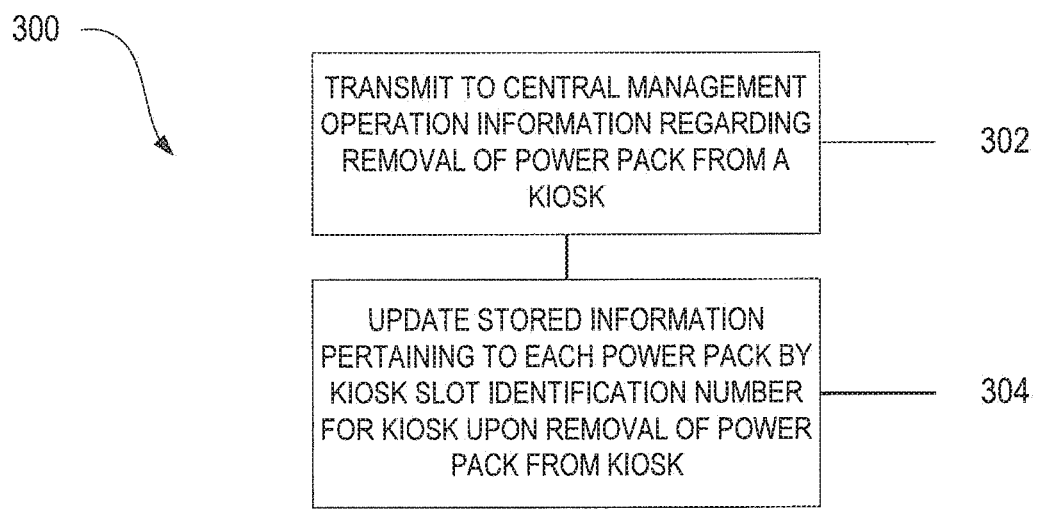

FIG. 22 shows a method 300 of operating the power pack vending system 100 described above. At 302, transmitting to the central management operation 102 information regarding removal of a power pack 12 from a kiosk 10. At 304, updating the stored information pertaining to each power pack 12 by the kiosk slot identification number for the kiosk 10 upon removal of a power pack 12 from the kiosk 10.

Figure 23:
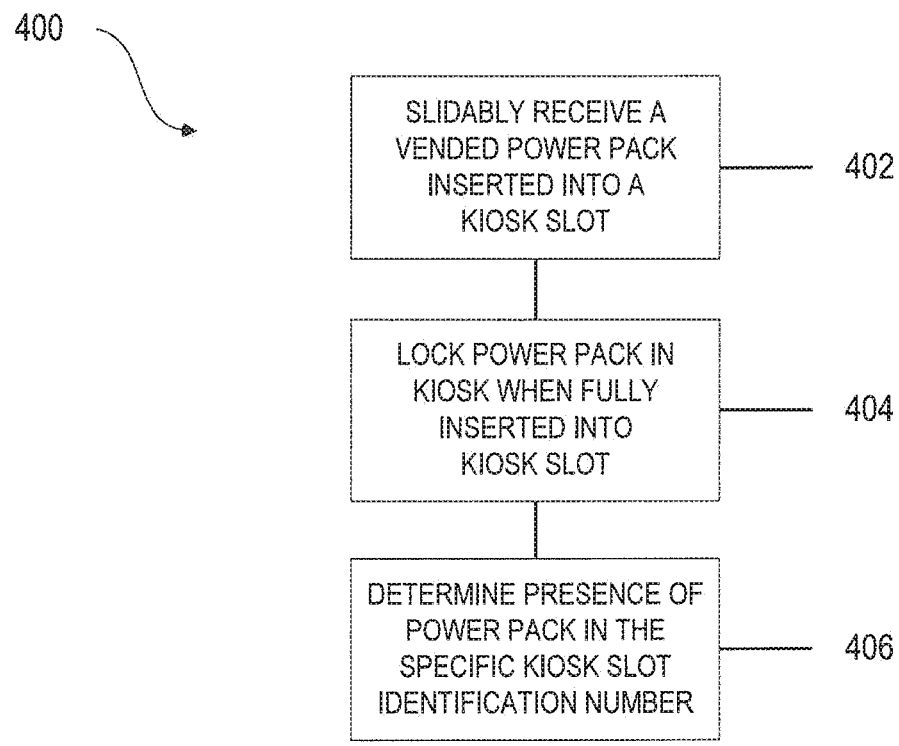

FIG. 23 shows a method 400 of operating the power pack vending system 100 described above. At 402, a kiosk 10 slidably receives a vended power pack 12 inserted into the kiosk slot 38. At 404, the power pack 12 is locked in the kiosk 10 when fully inserted into the kiosk slot 38 and the presence of the power pack in the specific kiosk slot identification number is determined.

Figure 24:
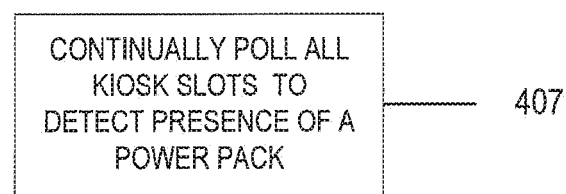

In one embodiment, the step 406 of determining the presence of the power pack comprises continually polling all of the kiosk slots to detect the presence of a power pack as shown in FIG. 24 at 407.

It is to be understood that the technology is operational with numerous other general purpose or special purpose computing system environments or configurations. Some examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, a processor may be any conventional general purpose single- or multi-chip processor including, but not limited to, a Pentium® processor, a Pentium® Pro processor, an 8051 processor, a MIPS® processor, a Power PC® processor, or an Alpha® processor. In addition, the processor may be a microcontroller or any conventional special purpose processor such as a digital signal processor or a graphics processor.

Instructions refer to computer-implemented steps for processing information in the system 100. Instructions can be implemented in software, firmware or hardware and include any type of programmed step undertaken by components of the system 100.

The system 100 is comprised of various modules as discussed in detail. As can be appreciated by one of ordinary skill in the art, each of the modules comprises various subroutines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system 100 may be used in connection with various operating systems such as Linux®, UNIX® or Microsoft Windows® and may be written in any conventional programming language for which commercial compilers can be used to create executable code.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a microcontroller, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A power pack vending system for providing charged power packs to power portable electronic devices, the power pack vending system comprising:
   at least one vending kiosk comprising:

an outer housing assembly;
a user interface portion;
a plurality of rechargeable power packs, each power pack in the vending system comprising an outer case, each power pack having its own unique identifier and two power contacts for charging the power pack, and each power pack having a device connector arranged and designed to electrically connect with the portable electronic device;
a magazine having a plurality of slots, each slot having a slot identification number and each slot arranged and designed to receive only one power pack at a time, each slot having a locking member and two power pins;
wherein upon full insertion of the power pack in the magazine slot, the locking member in the magazine slot engages the power pack and locks the power pack in the slot, and the two power pins contact the two power contacts;
a charging unit adapted to charge the plurality of power packs received within the plurality of magazine slots; and
a kiosk computer for receiving the unique identifier of each power pack received within the magazine, the specific slot each power pack is in, and current power pack information of each power pack received within the magazine, and the kiosk computer controlling the charging of the plurality of power packs by the charging unit, and
wherein the outer housing assembly includes an overflow slot door and an overflow slot in communication with an overflow bin in the vending kiosk, the overflow door, slot and bin are arranged and designed to receive a power pack returned to the vending kiosk by a customer only when there are no unoccupied magazine slots.

2. The power pack vending system of claim 1, wherein each of the plurality of power packs is arranged and designed to be received within any unoccupied magazine slot.

3. The power pack vending system of claim 1, wherein the vending kiosk does not physically transfer the plurality of rechargeable power packs within the vending kiosk.

4. The power pack vending system of claim 1, wherein the magazine is modular and removable and arranged and designed to be slid into and out of the outer housing assembly.

5. The power pack vending system of claim 1, wherein the vending kiosk further comprises a back-up battery within the outer housing assembly, the back-up battery arranged and designed to provide the vending kiosk with power temporarily.

6. The power pack vending system of claim 1, wherein each power pack further comprises:
a main body comprising the outer case defining a substantially rectangular prism having upper and lower surfaces, first and second side surfaces and front and rear end surfaces, the outer case defining a case opening in the upper surface and rear end surface; and
a device connector assembly having first and second ends, the first end connected to the main body and the second end having the device connector arranged and designed to electrically connect with the portable electronic device,
wherein the device connector assembly has a first position and a second position, in the first position the device connector assembly is substantially within the case opening such that the device connector assembly is substantially flush with the rear end surface and the device connector is completely concealed, and in the second position the device connector is exposed and elevated above the upper surface of the power pack main body.

7. The power pack vending system of claim 1, wherein the plurality of magazine slots are the same physical slot size and each of the plurality of power packs is arranged and designed to be received within any one of the plurality of magazine slots.

8. The power pack vending system of claim 1, further comprising:
a central management operation comprising a central computer and a central database, the central management operation in communication with each of the kiosks, the central database including a power pack database for storing power pack information for every power pack distributed in the power pack vending system, and a customer database for storing customer information for the power pack vending system;
wherein the central management operation receives, stores and processes information received from each of the kiosks, including information regarding customer transactions and the unique identifier of each power pack at each kiosk by the kiosk slot identification number and the central management operation sends information to each of the kiosks.

9. The power pack vending system of claim 1, wherein the two power contacts of each power pack are at a rear end surface of the outer case and have no movement relative to the outer case, and the two power contacts are arranged and designed to electrically charge the power pack when received in the magazine.

10. The power pack vending system of claim 1, wherein each of the power packs has a cavity in the outer case and the locking member in the magazine slot has a locking tab arranged and designed to be received within the cavity when the power pack is stored in the magazine slot.

11. The power pack vending system of claim 1, wherein the outer case of each power pack in the vending system is identical in physical size.

12. The power pack vending system of claim 1, wherein the device connector is one of at least three types of device connector with each type of device connector adapted to connect to a different type of portable electronic device.

13. The power pack vending system of claim 1, wherein
each power pack has a data contact;
each magazine slot has a data pin; and
each of the power packs and each of the magazine slots are arranged and designed so that the power packs can only be inserted in the magazine slots in a single correct orientation,
wherein upon full insertion of the power pack in the magazine slot, the data pin contacts the data contact.

14. The power pack vending system of claim 13, wherein the data contact provides data communication between the power pack and the kiosk computer when received in the magazine.

15. A power pack vending system for providing charged power packs to power portable electronic devices, the power pack vending system comprising:
a central management operation and at least one vending kiosk in communication with one another;
wherein the at least one vending kiosk comprises:
a user interface portion;

a magazine having a plurality of slots, each slot having a kiosk slot identification number;

a plurality of rechargeable power packs, each power pack in the vending system comprising an outer case identical in physical size, having its own unique identifier and sized to be received within one magazine slot, and each power pack having one of at least three types of device connector, each type of device connector adapted to connect to a different type of portable electronic device;

a charging unit for charging a power pack; and a kiosk computer for receiving the unique identifier of each power pack received within the magazine, the specific slot each power pack is in, and current power pack information of each power pack received within the magazine, and the kiosk computer controlling the charging of the plurality of power packs by the charging unit; and wherein the central management operation comprises:

a central computer for receiving, storing and processing information received from the at least one vending kiosk, including information regarding customer transactions and the unique identifier of each power pack at the at least one vending kiosk by the kiosk slot identification number, the central computer sending information to each of the at least one vending kiosk; and a central database for storing and maintaining the unique identifier of each power pack at the at least one vending kiosk by the kiosk slot identification number, the central database comprising:

a power pack database for storing power pack information for every power pack distributed in the power pack vending system; and a customer database for storing customer information for the power pack vending system.

16. The power pack vending system of claim 15, wherein the user interface portion comprises a visual display of pertinent information and permits users to communicate with the at least one vending kiosk.

17. The power pack vending system of claim 15, wherein the at least one vending kiosk comprises a plurality of vending kiosks, and each vending kiosk comprises a network communications module configured to receive and transmit information to the central management operation.

18. The power pack vending system of claim 15, wherein each of the plurality of rechargeable power packs is arranged and designed to be received within any unoccupied magazine slot.

19. The power pack vending system of claim 15, wherein the at least one vending kiosk does not physically transfer the plurality of rechargeable power packs within the vending kiosk.

20. The power pack vending system of claim 15, wherein the at least one vending kiosk includes an outer housing assembly, wherein the magazine is modular and removable and arranged and designed to be slid into and out of the outer housing assembly.

21. The power pack vending system of claim 15, wherein the plurality of magazine slots are the same physical slot size and each of the plurality of power packs is arranged and designed to be received within any one of the plurality of magazine slots.

* * * * *